US00RE44427E

(19) United States
(12) Reissued Patent
Runquist et al.

(10) Patent Number: US RE44,427 E
(45) Date of Reissued Patent: Aug. 13, 2013

(54) APPARATUS FOR DIRECTIONAL BORING UNDER MIXED CONDITIONS

(75) Inventors: Randy R. Runquist, Knoxville, IA (US); Mark Van Houwelingen, Knoxville, IA (US); James R. Rankin, Pella, IA (US); ReneMarcel Albert, Begijnendijk (BE)

(73) Assignee: Vermeer Manufacturing Company, Pella, IA (US)

(21) Appl. No.: 13/355,308

(22) Filed: Jan. 20, 2012

Related U.S. Patent Documents

Reissue of:
(64) Patent No.: 6,454,025
Issued: Sep. 24, 2002
Appl. No.: 09/518,419
Filed: Mar. 3, 2000

U.S. Applications:
(60) Provisional application No. 60/122,593, filed on Mar. 3, 1999.

(51) Int. Cl.
*E21B 10/00* (2006.01)

(52) U.S. Cl.
USPC ..... 175/61

(58) Field of Classification Search
USPC ..... 175/61, 62, 73–76, 325.5–325.7, 175/107, 19, 24, 45, 398; 166/65.1, 242.6
See application file for complete search history.

(56) References Cited

U.S. PATENT DOCUMENTS

| | | | |
|---|---|---|---|
| 3,307,639 | A | 3/1967 | Wilder et al. |
| 3,327,790 | A | 6/1967 | Vincent et al. |
| 3,656,161 | A | 4/1972 | MacPherson |
| 3,712,387 | A | 1/1973 | Vincent et al. |
| 3,946,819 | A | 3/1976 | Hipp |
| 4,084,646 | A | 4/1978 | Kurt |
| 4,379,493 | A | 4/1983 | Thibodeaux |
| 4,440,244 | A | 4/1984 | Wiredal |
| 4,487,274 | A | 12/1984 | Hurt |
| 4,530,408 | A | 7/1985 | Toutant |
| 4,646,277 | A | 2/1987 | Bridges et al. |
| 4,667,751 | A | 5/1987 | Geczy et al. |
| 4,674,579 | A | 6/1987 | Geller et al. |

(Continued)

FOREIGN PATENT DOCUMENTS

| | | |
|---|---|---|
| BE | 865954 | 7/1978 |
| DE | 28 47 128 A1 | 5/1980 |

(Continued)

OTHER PUBLICATIONS

Bui, H.D. et al., "Introduction of Steerable Percussion Air Drilling System," SPE 38582, SPE Annual Technical Conference and Exhibition, San Antonio, Texas (Oct. 5-8, 1997).

(Continued)

*Primary Examiner* — Robert Pezzuto

(57) ABSTRACT

A drill head for an apparatus for horizontal directional drilling. The drill head includes a device for detecting angular orientation, a holder for the device for detecting angular orientation, the device for detecting angular orientation being disposed therein, a hammer driven by a liquid and a drill bit. The holder, the hammer and the drill bit are connected head to tail along a longitudinal axis of a drill string with the holder at a proximate end of the drill head and the drill bit at a distal end of the drill head.

37 Claims, 13 Drawing Sheets

(56) References Cited

U.S. PATENT DOCUMENTS

| | | | |
|---|---|---|---|
| 4,694,913 | A | 9/1987 | McDonald et al. |
| 4,697,775 | A | 10/1987 | Wille |
| 4,714,118 | A | 12/1987 | Baker et al. |
| 4,784,230 | A | 11/1988 | Cherrington et al. |
| 4,787,463 | A | 11/1988 | Geller et al. |
| 4,806,869 | A | 2/1989 | Chau et al. |
| 4,821,815 | A | 4/1989 | Baker et al. |
| 4,834,193 | A | 5/1989 | Leitko, Jr. et al. |
| 4,852,669 | A | 8/1989 | Walker |
| 4,858,704 | A | 8/1989 | McDonald et al. |
| 4,867,255 | A | 9/1989 | Baker et al. |
| 4,875,292 | A | 10/1989 | Gibson |
| 4,907,658 | A | 3/1990 | Stangl et al. |
| 4,928,775 | A | 5/1990 | Lee |
| 4,945,999 | A | 8/1990 | Malzahan |
| 4,947,944 | A | 8/1990 | Coltman et al. |
| 4,953,633 | A | 9/1990 | Hermans |
| 5,002,138 | A | 3/1991 | Smet |
| 5,010,965 | A | 4/1991 | Schmelzer |
| 5,014,796 | A | 5/1991 | Gustafsson |
| 5,052,503 | A | 10/1991 | Lof |
| 5,070,462 | A | 12/1991 | Chau |
| 5,070,848 | A | 12/1991 | Mitsuyasu |
| RE33,793 | E | 1/1992 | Cherrington et al. |
| 5,107,944 | A | 4/1992 | Gustafsson |
| 5,119,891 | A | 6/1992 | Flynn |
| 5,133,417 | A | 7/1992 | Rider |
| 5,139,086 | A | 8/1992 | Griffith, Sr. |
| 5,155,442 | A | 10/1992 | Mercer |
| 5,163,521 | A | 11/1992 | Pustanyk et al. |
| 5,174,033 | A | 12/1992 | Rider |
| 5,205,363 | A | 4/1993 | Pascale |
| 5,242,026 | A | 9/1993 | Deken et al. |
| 5,305,837 | A | 4/1994 | Johns et al. |
| 5,449,046 | A | 9/1995 | Kinnan |
| 5,490,569 | A | 2/1996 | Brotherton et al. |
| 5,607,280 | A | 3/1997 | Rozendaal |
| 5,633,589 | A | 5/1997 | Mercer |
| 5,680,904 | A | 10/1997 | Patterson |
| 5,682,956 | A | 11/1997 | Deken et al. |
| 5,715,897 | A | 2/1998 | Gustafsson |
| 5,722,496 | A | 3/1998 | Connell et al. |
| 5,778,991 | A | 7/1998 | Runquist et al. |
| 5,785,995 | A | 7/1998 | Daisy, Jr. et al. |
| 5,795,991 | A | 8/1998 | Hesse et al. |
| 5,803,187 | A | 9/1998 | Javins |
| 5,872,703 | A | 2/1999 | Williams et al. |
| 5,876,152 | A | 3/1999 | Hesse |
| 5,880,680 | A | 3/1999 | Wisehart et al. |
| 5,890,540 | A | 4/1999 | Pia et al. |
| 5,899,283 | A | 5/1999 | Cox |
| 5,937,954 | A | 8/1999 | Puttmann et al. |
| 5,944,121 | A | 8/1999 | Bischel et al. |
| 6,012,536 | A | 1/2000 | Puttmann et al. |
| 6,021,856 | A | 2/2000 | Pascale |
| 6,148,935 | A | 11/2000 | Wentworth et al. |
| 6,308,787 | B1 | 10/2001 | Alft |
| 6,411,094 | B1 | 6/2002 | Gard et al. |
| 6,454,025 | B1 | 9/2002 | Runquist et al. |
| 6,588,516 | B2 | 7/2003 | Runquist et al. |

FOREIGN PATENT DOCUMENTS

| | | | |
|---|---|---|---|
| DE | 44 32 710 | C1 | 4/1996 |
| DE | 196 12 902 | A1 | 10/1997 |
| DE | 196 18 298 | A1 | 11/1997 |
| EP | 0 343 800 | A2 | 11/1989 |
| EP | 0 467 642 | A2 | 1/1992 |
| EP | 0 394 567 | B1 | 10/1993 |
| EP | 0 806 543 | A1 | 11/1997 |
| EP | 0 857 852 | A2 | 8/1998 |
| EP | 0 857 853 | A2 | 8/1998 |
| EP | 0 984 132 | A2 | 3/2000 |
| EP | 0 994 235 | A2 | 4/2000 |
| JP | 7-259481 | | 10/1995 |
| WO | 96/11323 | | 4/1996 |
| WO | WO 96/11323 | | 4/1996 |
| WO | WO 97/46739 | | 12/1997 |
| WO | WO 99/19596 | | 4/1999 |
| WO | WO 00/11303 | | 3/2000 |
| WO | WO 00/47860 | | 8/2000 |
| WO | WO 00/52294 | | 9/2000 |
| WO | WO 00/55467 | | 9/2000 |

OTHER PUBLICATIONS

Maurer, W.C. et al., "Rapid Deployment Drilling System for On-Site Inspections Under a Comprehensive Test Ban Preliminary Engineering Design," Repoort No. UCRL-CR-125259, 62 pages(Sep. 1996).

Innovative Technology Summary Report DOE/EM-0378, Horizontal Wells Subsurface Contaminants Focus Area, 28 pages (Sep. 1998).

International Search Report cited in PCT/US01/06894 mailed Sep. 14, 2001, 11 pages.

Chinese First Office Action cited in 01806027.7 mailed Feb. 18, 2005, 6 pages (with English Translation).

Response to Chinese First Office Action cited in 01806027.7 filed Jul. 4, 2005, 4 pages.

Chinese Second Office Action cited in 01806027.7 mailed Jun. 29, 2007, 8 pages (with English Translation).

Chinese Third Office Action cited in 01806027.7 mailed Apr. 18, 2008, 6 pages (with English Translation).

Chinese First Office Action cited in Application No. 200810214870.3 mailed Mar. 22, 2011, 11 pages (with English Translation).

Response to Chinese First Office Action cited in Application No. 200810214870.3 filed Sep. 6, 2011, 8 pages.

Chinese Second Office Action cited in Application No. 200810214870.3 mailed Apr. 6, 2012, 4 pages (with English Translation only).

German Office Action cited in Application No. 101 95 85.4-24 mailed Jan. 27, 2010, 3 pages.

Response to German Office Action cited in Application No. 101 95 854.4-24 filed. Sep. 14, 2010, 8 pages.

Swedish Office Action cited in Application No. 0202592-2 mailed Aug. 8, 2003, 6 pages (with English Translation).

Response to Swedish Office Action cited in Application No. 0202592-2 filed Feb. 6, 2004, 7 pages.

Swedish Notice of Acceptance cited in Application No. 0202592-2 mailed Apr. 28, 2004, 4 pages (with English Translation).

Response to Swedish Notice of Acceptance cited in Application No. 0202592-2 filed Jun. 10, 2004, 2 pages.

U.S. Restriction Requirement cited in U.S. Appl. No. 09/518,419 mailed Jun. 5, 2001, 5 pages.

Response to Restriction Requirement in U.S. Appl. No. 09/518,419 filed Jul. 5, 2011, 2 pages.

U.S. Office Action cited in U.S. Appl. No. 09/518,419 mailed Sep. 20, 2001, 9 pages.

Response to Office Action in U.S. Appl. No. 09/518,419 filed Jan. 22, 2002, 10 pages.

U.S. Notice of Allowance in U.S. Appl. No. 09/518,419 mailed Feb. 26, 2002, 11 pages.

U.S. Notice of Allowance in U.S. Appl. No. 10/191,109 mailed Feb. 10, 2003, 6 pages.

Chinese Final Office Action for Application No. 200810214870.3 mailed Sep. 28, 2012 (with English Translation).

Response to Chinese Final Office Action for Application No. 200810214870.3 filed Dec. 28, 2012.

German Office Action for Application No. 101 95 854.4-24 mailed Aug. 10, 2012.

72B
75B 5B
72B
21B
19B
5B 21B
73
96B
97B
72B
19B
22B
20B
99B
22B 19A
7
6
6
7

13
12
14
85
10
16
81
83
80
20
18
23
19A
23

13
12
14
85
10
16
80
20
18
23
19A
23
96A
99A

APPARATUS FOR DIRECTIONAL BORING UNDER MIXED CONDITIONS

Matter enclosed in heavy brackets [ ] appears in the original patent but forms no part of this reissue specification; matter printed in italics indicates the additions made by reissue.

This application claims the benefit of U.S. Provisional Application No. 60/122,593, filed Mar. 3, 1999.

TECHNICAL FIELD OF THE INVENTION

The invention relates to directional boring and, in particular to a system for boring through both soil and solid rock using the same machine.

BACKGROUND OF THE INVENTION

At present, when underground utilities such as natural gas, potable water, or sanitary sewer pipes are placed in rock, trenches are excavated using large hard rock trenching equipment such as the Vermeer T-655, or possibly even shot using explosives. In these conditions, electric, telephone and cable TV lines are normally strung overhead along poles, mostly due to the difficulty and expense of placing them underground. Thus, in many situations, a solid rock formation will cause utility lines to be located above ground due to the difficulty of underground installation. Many such sites involve mixed conditions involving both a solid rock formation for part of the run and soil for the remainder, often at the beginning and end of the run. In such a situation, rock drilling or trenching equipment may lack the capability to bore through the soil to reach the rock formation.

Directional boring apparatus for making holes through soil are well known. The directional borer generally includes a series of drill rods joined end to end to form a drill string. The drill string is pushed or pulled through the soil by means of a powerful hydraulic device such as a hydraulic cylinder. See Malzahn, U.S. Pat. Nos. 4,945,999 and 5,070,848, and Cherrington, U.S. Pat. No. 4,697,775 (RE 33,793). The drill string may be pushed and rotated at the same time as described in Dunn, U.S. Pat. No. 4,953,633 and Deken, et al., U.S. Pat. No. 5,242,026. A spade, bit or head configured for boring is disposed at the end of the drill string and may include an ejection nozzle for water to assist in boring.

In one variation of the traditional boring system, a series of drill string rods are used in combination with a percussion tool mounted at the end of the series of rods. The rods can supply a steady pushing force to the impact and the interior of the rods can be used to supply the pneumatic borer with compressed air. See McDonald et al. U.S. Pat. No. 4,694,913. This system has, however, found limited application commercially, perhaps because the drill string tends to buckle when used for pushing if the bore hole is substantially wider than the diameter of the drill string.

Accurate directional boring necessarily requires information regarding the orientation and depth of a cutting or boring tool, which almost inevitably requires that a sensor and transmitting device ("sonde") be attached to the cutting tool to prevent mis-boring and re-boring. One such device is described in U.S. Pat. No. 5,633,589, the disclosure of which is incorporated herein for all purposes. Baker U.S. Pat. No. 4,867,255 illustrates a steerable directional boring tool utilizing a pneumatic impactor.

Directional boring tools with rock drilling capability are described in Runquist U.S. Pat. No. 5,778,991 and in Cox European Patent Applications Nos. EP 857 852 A2 and EP 857 853 A2. However, although directional boring tools for both rock drilling and soil penetration are known, no prior art device has provided these capabilities in a single machine together with the ability to steer the tool in both soil and rock. The present invention addresses this need.

There is also a need in the art for a directional boring tool for rock drilling and soil penetration that provides a percussion hammer driven by liquid fluids, provides indexing of a device for detecting angular rotation (e.g., a sonde) and provides a method for ON/OFF control of the percussion hammer (e.g., pneumatic or liquid driven). In addition, there is a need for an apparatus that provides improved steerability of the drill head.

SUMMARY OF THE INVENTION

A drill head for an apparatus for directional boring according to the invention includes a holder (or housing) for a device for detecting angular orientation such as a sonde, a pneumatic hammer and a rotary bit assembly connected head to tail with the angular orientation housing at one end and the bit at the other. The drill head may also include a starter rod, which may be connected to the angular orientation detector housing. The bit preferably has a frontwardly facing main cutting surface with a plurality of cutting teeth disposed thereon and a gage tower radially outwardly offset from the main cutting surface having at least one frontwardly facing gage cutting tooth thereon suitable for cutting over an angle defined by less than a full rotation of the bit. The device for detecting angular orientation is in a predetermined alignment with the gage tower so that it determines the orientation of the gage tower relative to the axis of rotation of the drill head. In one preferred embodiment, the main cutting surface is substantially flat and circular and has a series of fluid ejection ports thereon, and the drill head has passages for conducting a drill fluid therethrough to the ejection ports. In another preferred embodiment, the bit has a heel portion on an outer side surface thereof at a position opposite the gage tower, which heel portion slopes inwardly from back to front.

Such a drill head may be used in a method for directional boring according to the invention using a directional boring machine which can push and rotate a drill string having the drill head mounted thereon. Such a method comprises the steps of boring straight through a medium by pushing and rotating the drill head with the drill string while delivering impacts to the bit with the hammer, prior to changing the boring direction, determining the angular orientation of the gage tower using the device for detecting angular orientation, and changing direction during boring by pushing and rotating the bit repeatedly over an angle defined by less than a full rotation of the bit while delivering impacts to the bit with the hammer, so that the drill head deviates in the direction of the cutting action of the gage tower. The medium may be soil, solid rock, or both at different times during the bore. In particular, the steps of boring straight and changing direction can be carried out in both soil and rock during the same boring run using the same bit.

According to a further aspect of the invention, a method is provided for directional boring in mixed conditions including both soil and solid rock. Such a method comprises the steps of boring straight in both soil and rock by pushing and rotating the drill head with the drill string while delivering impacts to the bit with the hammer, prior to changing the boring direction in both soil and rock, determining the angular orientation of the gage tower using the device for detecting angular orientation, changing direction when boring in rock by pushing and rotating the bit repeatedly over an angle defined by less than a full rotation of the bit while delivering impacts to the bit with the hammer, so that the drill head deviates in the direction of the cutting action of the gage tower, and changing direction when boring in soil by pushing the bit with the drill string without rotating it so that the drill head deviates in a direction of the gage tower and away from the heel portion. Since the main cutting face of the drill bit is large and flat, the pushing force of the drill string alone may be insufficient to steer the tool in soft ground without rotation. It is thus preferred to deliver impacts to the bit with the hammer while changing direction in soil. This method of the invention may provide better steering in some ground conditions.

Another aspect of the invention provides a drill head for an apparatus for horizontal directional drilling, comprising: a device for detecting angular orientation; a holder for the device for detecting angular orientation, the device for detecting angular orientation being disposed therein; a hammer driven by a liquid, the hammer arranged and configured to generate percussive blows; and a rotary bit assembly connected to the hammer, the rotary bit assembly arranged and configured for receiving the percussive blows, and wherein the rotary bit assembly is oriented through use of the device for detecting angular orientation to steer the drill head.

Still another aspect of the invention provides an apparatus for use in horizontal directional drilling in compressible soil, of the type having a drill string coupled to a directional boring machine at a proximal end and a drill head coupled to the drill string at a distal end of the drill string, comprising: a drill bit generally adapted and configured to bore through rock; a device for determining the angular orientation of the drill bit and for providing a generated signal corresponding to the orientation; and an offset coupling member attached at a first end to the drill string and at a second end to the drill bit, the member being offset from the longitudinal axis of the drill string, wherein, the offset member is oriented in response to the generated signals to steer the drill bit.

Still a further aspect of the invention provides a method for boring a hole through rock using a horizontal drilling apparatus and steering a drill head of the drilling apparatus, comprising: pushing the drill head, the drill head located at a front end of a drill string, through a medium; delivering impacts to a drill bit located at a distal end of the drill head with a hammer driven by a liquid, wherein the drill bit includes an effective steering geometry suitable for steering the drill head; periodically determining the angular orientation of the drill bit using a device for detecting angular orientation disposed on the drill head; and steering the drill head by pushing and rotating the drill bit repeatedly over an angle defined by less than a full rotation of the drill bit while delivering impacts to the drill bit with the hammer, so that the drill head deviates in the direction of the cutting action of the effective steering geometry.

Yet a further aspect of the invention provides a method for boring a hole through a medium using a horizontal drilling apparatus and steering a drill head of the drilling apparatus, comprising: pushing the drill head located at a front end of a drill string through a medium while delivering impacts to a drill bit located at a distal end of the drill head with a hammer driven by a liquid, wherein the drill bit includes an effective steering geometry suitable for steering the drill head and the drill head; periodically determining the angular orientation of the drill bit using a device for detecting angular orientation disposed on the drill head; and steering the drill head by: if boring through a compressible soil, changing direction during boring by pushing the drill string, so that the drill head deviates in the direction of an offset coupling member, which is offset from a center line of a longitudinal axis of the drill string without delivering impacts to the drill bit with the hammer and without rotating the drill string; or if boring through rock, delivering impacts to the drill bit with the hammer, so that the drill head deviates in the direction of the effective steering geometry.

Another aspect of the invention provides a horizontal directional drilling apparatus having a drill string adapted to bore through rock and compressible soil, the drilling apparatus having an aggressive flushing type hammer driven by a liquid, a method of operating an aggressive flushing type hammer, comprising: determining whether to active the aggressive flushing type hammer; if drilling in rock and the hammer is to be activated: reducing the liquid flow for driving-the hammer to a first value substantially close to zero; applying a thrust force exceeding a predetermined threshold by a drive member of the drilling apparatus to the drill string and causing the hammer to shift out of a flushing position; and increasing the liquid flow to a predetermined threshold and continuing drilling in rock with the hammer activated; if drilling in compressible soil and the hammer is not to be activated: reducing the thrust force below a predetermined threshold while maintaining liquid pressure above a predetermined threshold on the hammer, thereby shifting the hammer into the flushing position; and continuing drilling in compressible soil without the hammer activated.

Yet another aspect of the invention provides a horizontal directional drilling apparatus having a drill string adapted to bore through rock and compressible soil, the drilling apparatus having a standard type hammer driven by a liquid, a method of operating a standard type hammer, comprising: determining whether to active the standard type hammer; if drilling in rock and the hammer is to be activated: Increasing the liquid flow to a value above a predetermined threshold; or increasing a thrust force generated by a drive member of the horizontal drilling apparatus to a value above a predetermined threshold; and continuing drilling in rock with the hammer activated; if drilling in compressible soil and the hammer is not to be activated: limiting the liquid flow to a value below a predetermined threshold required to activate the hammer; limiting the thrust force to a value below a predetermined threshold required to activate the hammer; and continuing drilling in compressible soil without the hammer activated.

Another aspect of the invention provides a system for use in horizontal directional drilling in compressible soil and rock, comprising: a horizontal directional drilling machine having a drill string coupled thereto, the directional drilling machine being used to rotate and push the drill string into a medium to be bored, the directional drilling machine including a drive member adapted to be coupled to a proximate end of the drill string and generally configured for applying a thrust force to the drill string; a pressure source for generating a working pressure to be transmitted through a liquid used for drilling; and a controller for controlling the thrust force generated by the drive member and for controlling the working pressure output of the pressure source; wherein the drill string includes at a distal end: a device for detecting angular orientation; a holder for the device for detecting angular orientation, the device for detecting angular orientation being disposed therein; a hammer driven by the liquid; and a drill bit; wherein, the holder, the hammer and the drill bit are connected head to tail along a longitudinal axis of the drill string with the holder being located at a proximate end of the drill head and the drill bit being located at a distal end of the drill head.

Another aspect of the invention provides a drill head for an apparatus for horizontal directional drilling, comprising: hammer driven by a liquid; and a drill bit driven by the hammer, the drill bit having an effective steering geometry.

Another aspect of the invention provides a drill head for an apparatus for horizontal directional drilling, comprising: a hammer driven by a liquid, the hammer arranged and configured to generate percussive blows; and a rotary bit assembly connected to the hammer, the rotary bit assembly arranged and configured for receiving the percussive blows, and having an effective steering geometry.

These aspects of the invention are described further in the detailed description that follows.

BRIEF DESCRIPTION OF THE DRAWINGS

In the accompanying drawings, wherein like numerals represent like elements.

DETAILED DESCRIPTION OF THE INVENTION

Figures 1, 2, 3, 4, 5A, 5B:
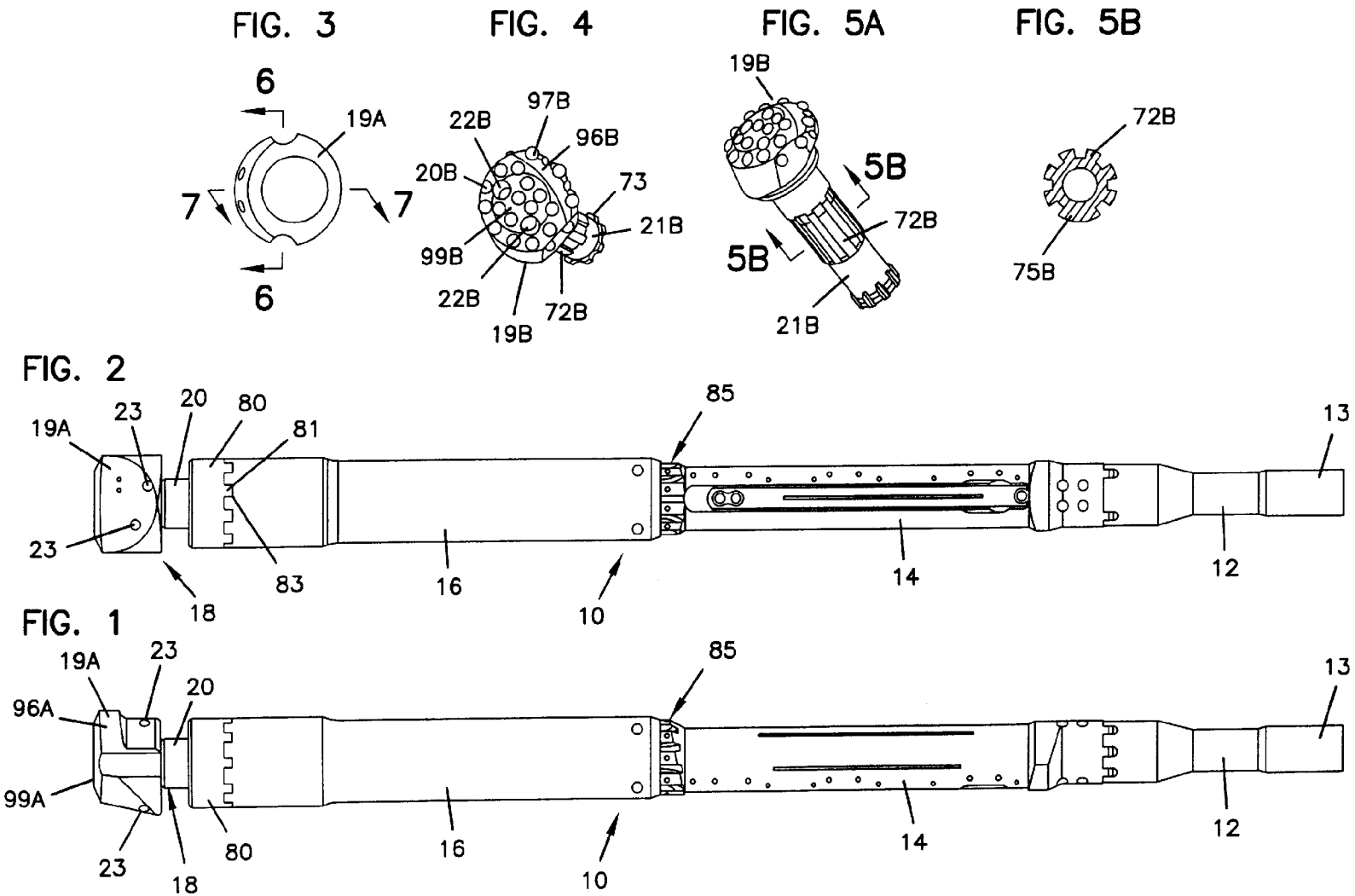
FIG. 1 is a side view of a first embodiment of a drill head according to the invention, with carbide teeth omitted from the bit.
FIG. 2 is a top view of the embodiment shown in FIG. 1, showing the sonde housing door.
FIG. 3 is a rear perspective view of the bit shown in FIG. 1, with bit shaft omitted.
FIG. 4 is a front perspective view of the first alternative bit according to the invention, with carbide teeth in place and mounted on a bit shaft.
FIG. 5A is a side perspective view of the bit and bit shaft shown in FIG. 4.
FIG. 5B is a cross sectional view taken along the line 5B-5B in FIG. 5A.

While making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and are not to delimit the scope of the invention. References to a numbered element shown in several alternative forms designated A, B etc. without such a letter are intended to refer to all of the alternative forms.

Referring to FIGS. 1-3, 6A-6B and 7A-B, a drill head 10 according to the invention includes, as general components, a sonde holder 14, pneumatic hammer 16 and bit assembly 18 connected head to tail as shown. As noted above, the drill head 10 can also include a starter rod 12. Starter rod 12 connects at its rear end 13 to a conventional drill string driven by a directional boring machine, and compressed air is fed through the drill string, starter rod 12 and a passage in the sonde holder 14 to operate the hammer 16. Bit assembly 18 includes a bit 19A having an array of cutting teeth 20A and a bit shaft 21A which is used to mount the bit 19A onto the front end of the hammer 16. Bit 19A is removably mounted to shaft 21A by means of roll pins inserted through transverse holes 23. Angled ports 22A are provided in the head 18 for ejecting compressed air from hammer 16 out of the front of bit 19A. The compressed air has been combined with a foam-forming agent so that a lubricating drilling foam forms spontaneously upon ejection/decompression from bit 19A. This foam is used to carry away soil and/or rock chips from the bit's path.

Starter rod 12, sonde holder 14 and pneumatic hammer 16 may be of types already known in the art. Hammer 16 may, for example, be an Ingersoll-Rand downhole hammer instead of the one shown. A splined connection of the type provided by Earth Tool Corporation of Wisconsin under the model designation Spline-Lock may be used to connect sonde holder 14 at either end to hammer 16 and starter rod 12. The same type of roll pin connection, omitting splines, is used to mount bit 19A onto shaft 21A as noted above.

FIGS. 6A-6B and 7A-7B show drill head 10 just prior to start up. Compressed fluid from the drill string flows along a central passage 32 in starter rod 12 and passes in turn into a lengthwise passage 34 in sonde holder 14, which passage 34 is isolated from the sonde compartment 36. The sonde (not shown) is mounted in accordance with conventional practice in a predetermined orientation relative to the bit, e.g., by fitting an end of the sonde to a small projection 38. Shock absorbers may be provided at opposite ends of the sonde compartment to isolate the sonde from vibrations and shocks.

The pressure fluid then passes out of the front end of passage 34 into a rear opening 40 in a valve stem 42 forming part of hammer 16. A rear annular flange 44 of valve stem 42 is held in place between an inwardly extending annular flange 46 of a tubular housing 48 of hammer 16 and a front end face of sonde housing 14. Pressure fluid flows from opening 40 into a manifold 50 having several radial ports 52, and then into an annular rear pressure chamber 54 formed between a reduced diameter front portion 56 of stem 42 and a rear tubular portion 58 of a striker 60. Pressure in this chamber urges striker 60 forwardly towards the position shown, wherein a front end of striker 60 delivers an impact to a rear anvil surface 62 of bit shaft 21A.

Figure 6A:
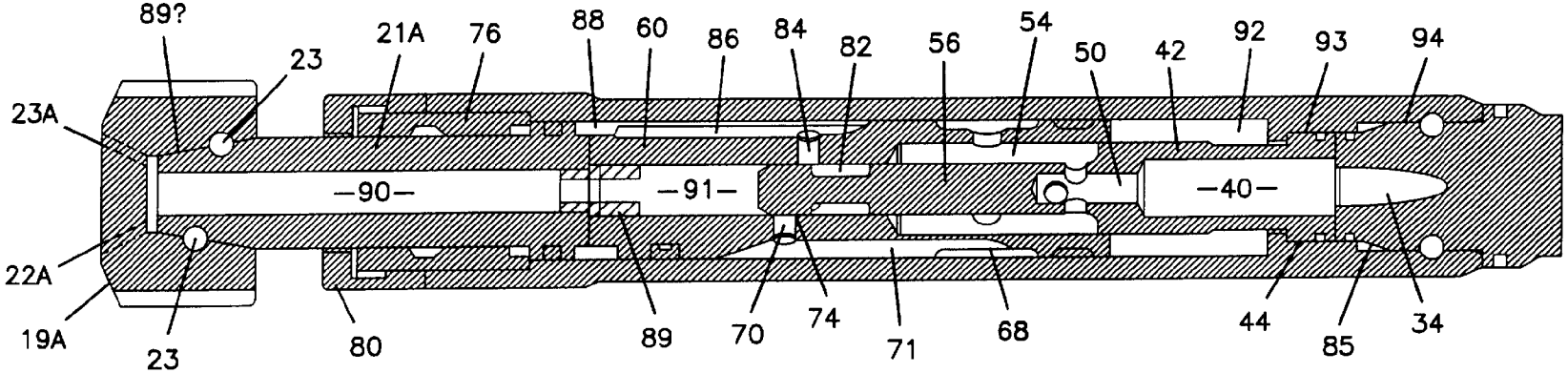
FIGS. 6A and 6B are enlarged, lengthwise sectional views taken along the line 6-6 in FIG. 3, wherein 6A shows a front part of the device and 6B the rear.
Figure 6B:
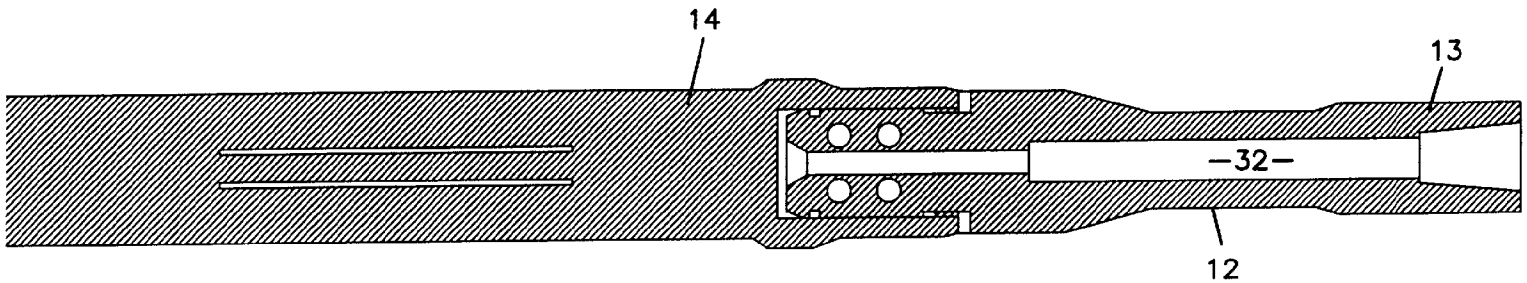
Figure 7A:
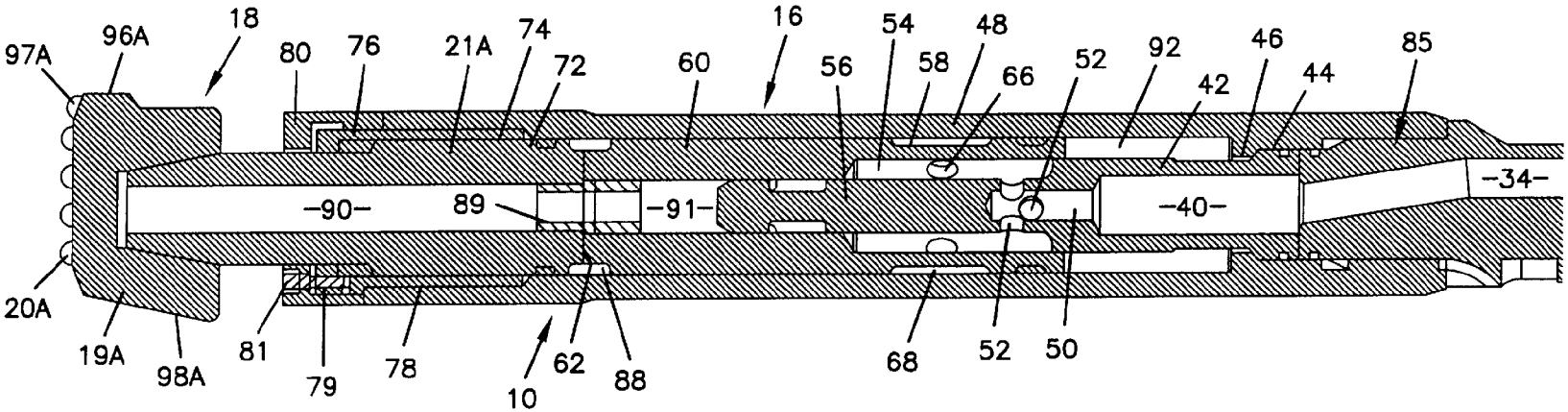
FIGS. 7A and 7B show an enlarged, lengthwise sectional view taken along the line 7-7 in FIG. 3, wherein 7A shows a front part of the device and 7B the rear.
Figure 7B:
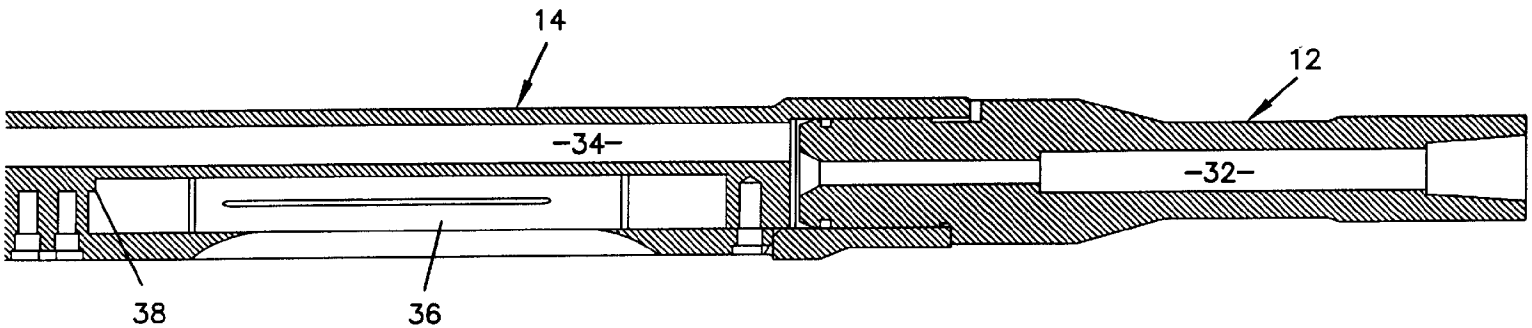
Figure 9:
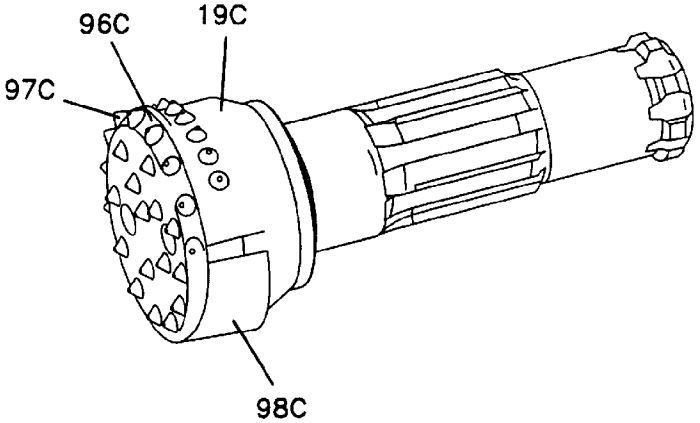
FIG. 9 is a side perspective view of the bit and bit shaft assembly of FIG. 8.
Figure 11:
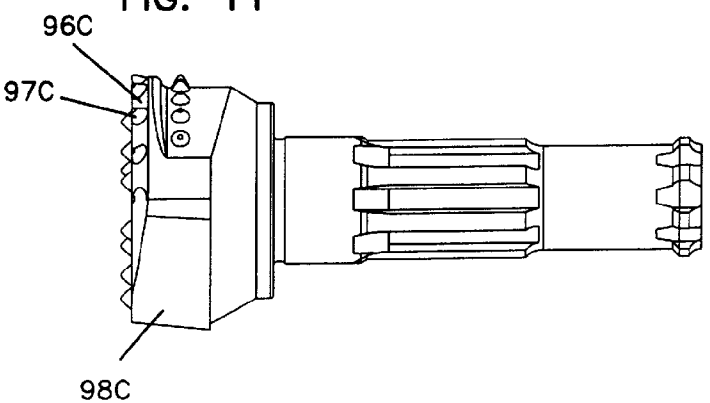
FIG. 11 is a side view of the bit and bit shaft assembly of FIG. 8.
Figure 8:
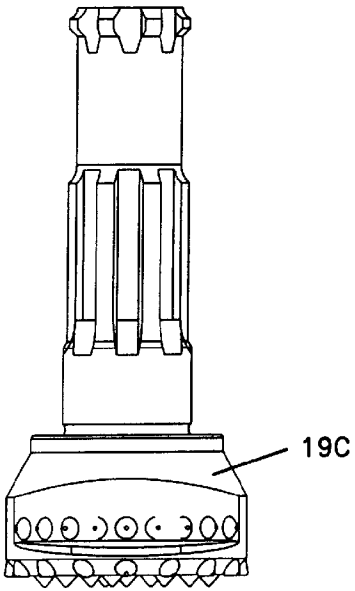
FIG. 8 is a top view of a second alternative bit and bit shaft assembly according to the invention.
Figure 10:
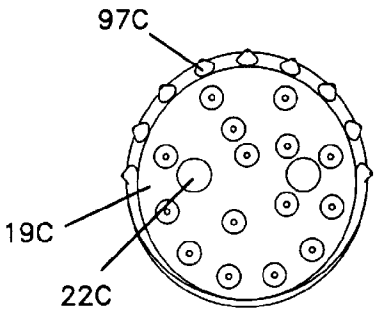
FIG. 10 is a front view of the bit of FIG. 8.
Figure 13:
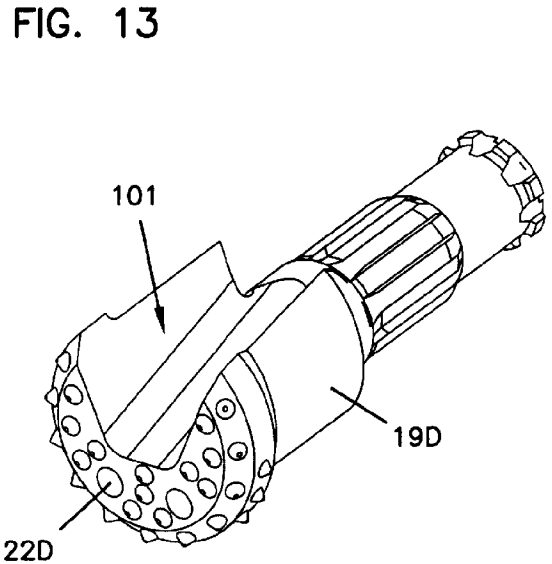
FIG. 13 is a side perspective view of the bit and bit shaft assembly of FIG. 12.
Figure 12:
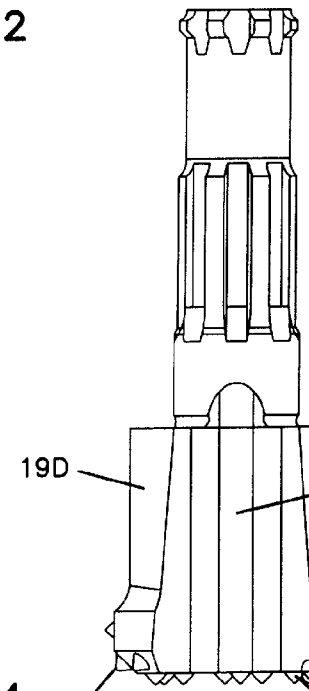
FIG. 12 is a top view of a third alternative bit and bit shaft assembly according to the invention.
Figure 15:
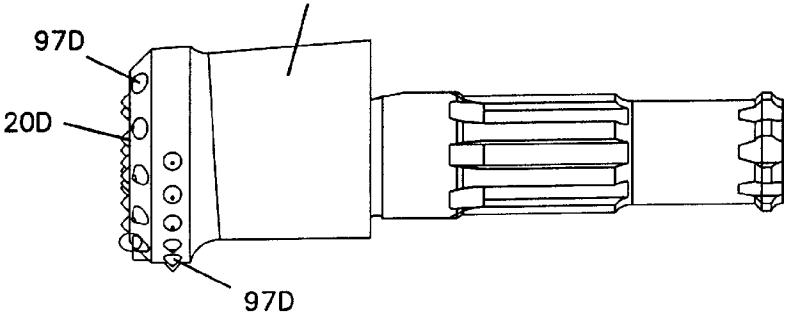
FIG. 15 is a side view of the bit and bit shaft assembly of FIG. 12.
Figure 14:
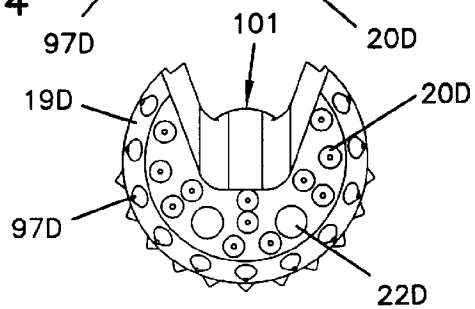
FIG. 14 is a front view of the bit of FIG. 12.

Radial ports 66 provided through rear tubular portion 58 permit pressure fluid to flow into an outwardly opening annular groove 68 on the outside of rear portion 58. As shown in FIG. 6A, groove 68 communicates with a radially inwardly extending port 70 in striker 60 by means of a longitudinal groove 71. At this point, however, the flow of fluid is blocked because port 70 is covered by a front surface 74 of reduced diameter portion 56 when striker 60 is in the position shown.

Bit shaft 21A is generally cylindrical but has a series of evenly spaced, radial splines 72A along its midsection which are elongated in the lengthwise direction of shaft 21A. Splines 72 fit closely and are slidably mounted in corresponding grooves 74 formed on the inside of a sleeve 76. Sleeve 76 is removably mounted in the front end of tubular housing 48, e.g., by means of threads 78, and has a front end cap 80 secured thereto by bolts 81. Splines-72 preferably include a master spline (see, e.g., 75B in FIG. 5B) of enhanced width which fits in a corresponding master groove in sleeve 76. Master spline 75 ensures that bit 19 is properly aligned with the sonde for steering, and steps should also be taken to ensure that the master groove in sleeve 76 is in the correct position. For this purpose, for example, the holes 79 for bolts 81 for mounting the sleeve 76 to the front end cap 80 may be arranged so that bolts 81 can only be inserted when holes 79 are in the proper position relative to cap 80. Cap 80 in turn has a series of splines 81 that engage grooves 83 in the front of the hammer housing and may, if desired, also include a master spline and groove combination to ensure a correct fit. The same grooves 83, if made deeper in a radial direction, could also be used to engage corresponding splines on sleeve 76 as an alternative means of keying sleeve 76 in the correct position.

For purposes of the present invention, a master spline and groove may be either larger or smaller in width than the other splines, so long as it provides the desired keying function. The splined joint 85 connecting hammer 16 to sonde housing 14 has a master spline and groove. In this manner, the series of keyed connections ensures that the bit 19, particularly the gage tower as described below, will be correctly oriented relative to the sonde.

As the drill string exerts pressure on drill head 10 in the forward direction, such pressure overcomes the pressure fluid and starts to move bit 19A back, narrowing the gap between bit 19A and front end cap 80. This in turn forces bit shaft 21A and striker 60 to move back in tandem. As this occurs, port 70 moves rearwardly and becomes uncovered when it reaches an outwardly opening annular groove 82 in reduced diameter front portion 56 of stem 42. At this time, compressed fluid flows through groove 82, outwardly through a second radial port 84 similar to port 70 but rearwardly offset from it, through a lengthwise elongated groove 86 in the outside of striker 60 to a front pressure chamber 88. At this point, striker 60 begins to move rearwardly due to the pressure in chamber 88, and a gap opens between striker 60 and rear anvil surface 62 of bit shaft 21A. However, a stepped plastic tube 89 mounted in the rear end of bit shaft 21A and in a front end of a bore 91 in striker 60 temporarily prevents compressed fluid from entering a central bore 90 in bit share 21A.

As striker 60 continues its rearward stroke, rear port 84 becomes covered by front portion 56 of stem 42 and striker 60 clears the rear end of plastic sleeve 89, permitting decompression of front chamber 88 through exhaust ports 22A. pressure fluid is ejected into the hole from the bit and turns into foam. At this point the force in rear pressure chamber 54 becomes greater, and the striker slows and reverses direction to begin its forward stroke. A chamber 92 to the rear of striker 60 is preferably vented by means of small passages 93 in the splined connection 94 to prevent excess pressure build up in chamber 92. In this manner the hammer 16 operates continuously and starts automatically when a predetermined threshold of pushing force is applied through the drill string.

Bit 19A has a radial extension or gage tower 96A that carries several gage cutters 97A which generally resemble the other carbide teeth or buttons 20A. This is better illustrated in FIGS. 4, 5A and 5B, wherein the bit 19B is similar to bit 19A, and bit shaft 21B is comparable to shaft 21A except that splines 72B are interrupted into front and rear sections as shown.

Figure 18:
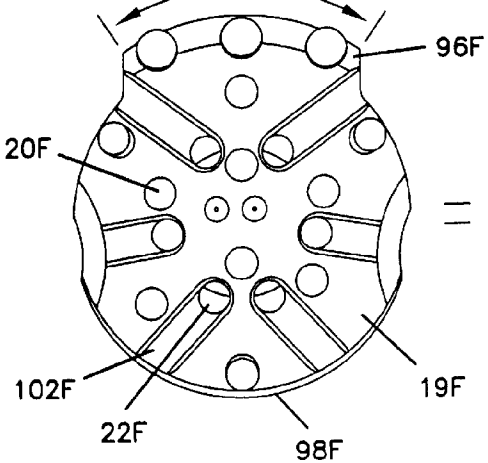
FIG. 18 is a front view of a fifth alternative bit according to the invention.

Preferably there are at least three gage cutters 97, e.g., one at the center of tower 96 and two others equally spaced from it, that define an arc, generally describing an imaginary circle larger than the outer circumference of bit 19. However, even a single cutter 97 may prove sufficient for some purposes, and thus the gage tower 96 need have no greater width than a single such cutter 97. However, it is preferred that the gage tower 96 define an angle A of from about 45 to 90 degrees relative to the lengthwise axis of the drill head 10 (see FIG. 18), or having a length of from about ½ to ¾ of the width of bit 19. Gage cutters 97, like teeth 20, are most preferably tungsten carbide buttons.

Gage is a term that defines the diameter of the bore created by the bit 19. This diameter is the size scribed by a heel portion 98 on the opposite side of bit 19 from the gage tower and one or more gage cutters 97 if the bit is rotated a full revolution. The heel area 98 functions as a bearing surface that provides a reaction force for the gage cutting action. A main cutting surface 99 containing the buttons 20 removes material from the central area of the bore in the same way a classic non-steerable percussion rock drill does.

FIGS. 4-5B and 8-20 illustrate several variations and styles of bits 19C, 19D, 19E, 19F that can be used in the present invention. As discussed hereafter, the heel 98 can be a relatively large sloped surface (98C) or have a very slight taper from rear to front (see 98F), depending on the manner in which the tool is to be operated. Similarly, the gage tower 96 may protrude a substantial distance (96E, 96F), or only slightly (96C), or not at all if bit 19 has a suitably asymmetrical shape. In FIGS. 12-15, a sloped trough 101 for carrying away soil and cuttings is provided. In FIGS. 16-20, each ejection port 22 further includes a shallow, generally radial groove 102E, 102F that extends from the port 22E, 22F and carries the foam to the outer periphery of the bit 19E, 19F. Each of these embodiments have proven successful in boring, although the bits 19E and 19F have proven most effective for conditions involving steering in both soil and rock.

The present invention allows a pipe or cable to be placed below the surface in solid rock conditions at a desired depth and along a path that can curve or contain changes in direction. The process described allows the operator to start at the surface or in a small excavated pit, drill rapidly through the rock with the aid of the pneumatic or fluid actuated percussion hammer 16, and make gentle steering direction changes in any plane. The operator can thus maintain a desired depth, follow a curving utility right of way or maneuver between other existing buried utilities that may cross the desired path.

One innovation lies specifically in the interaction between the shape of the bit during the percussive cutting process and the motion of the drill string which couples the directional boring machine to the hammer. Motion relative to the features on the bit is important. The bit 19F shown in FIGS. 18-20 does not rely on steer plane, slope or angle to cause a direction change. Direction change is accomplished due to the non-symmetrical bore hole shape created when bit 19F is impacted and rotated at constant angular velocity through a consistent angle of rotation and in a cyclic manner about the drill string, the angle being less than a full revolution.

The rotation velocity must be approximately constant to allow the carbide percussion cutters 20F, 97F to penetrate the entire bore face. The angle of rotation must be less than a full revolution so that the bore hole will be non-symmetrical. The angle traversed must be consistent for a multitude of cycles as the penetration per cycle will be limited, perhaps 0.05 to 0.25 per cycle depending on rock conditions and rotational velocity. The angle must be greater than zero or no cutting will take place, it is typically over 45 degrees up to 240 degrees, with the range of 180 to 240 providing the best results. The center point of the angular sweep must be kept consistent to induce a direction change.

The bore created will be non-symmetrical because the bit shape is non-symmetrical and it is not fully rotated about the drill string axis. Having bored for some distance using the actions described and for a multitude of cycles, the non-symmetrical bore will induce a gradual direction change (see, e.g., FIG. 16). The bore is larger than the drill head 10 or drill string, allowing the drill head axis and hence the bit to be angularly inclined relative to the bore axis. Spaced between the drill head and the bore wall allows the drill head 10 to be tipped or repositioned in the bore by induced drilling forces. Existence of the gage tower 96 makes the center of pressure on the bit face move from the drill head central axis (where non-steerable hammers have it) to some point closer to the gage cutters 97. The static thrust and mass act along the drill head axis. The reaction force from the percussive cutting action is significant, with peak forces easily reaching 50,000 LB for a period of several milliseconds per impact.

With the impact reaction force being along a different axis than the hammer mass and thrust, a moment (torque) is induced that will bend the drill head 10 and drill string within the clearance of the bore. The drill head will tend to rotate away from the gage tower. This action points that drill head in a new direction and causes to bore to progress along that axis. The axis is continually changing, which creates a curved bore path.

To avoid creating a round, symmetrical bore during the steering operation, the bit 19 must not cut for the entire revolution. To make this a cyclic process, the operator can either rotate in the opposite direction when the angular limit has been reached, or pull back off the face and continue rotation around until the start point is reached. A third alternative is to pull back off the face and rotate in the opposite direction to the start point. All three methods have been used successfully, but the third method may cause difficulty if a small angle of rotation is being used and the hole is highly non-symmetrical. In this case, the bit can't be rotated and may become stuck.

The predominant feature in all of the bits 19 shown that have been successful is the existence of gage cutters 97 mounted on a gage tower 96. Whether the bit has an inclined heel or wedge 98 designed into it or not, the gage tower must be present for the drill head 10 to steer successfully in solid rock. Drill head 10 will steer in granular, unconsolidated material such as soil without a gage tower but with a wedge. It will also steer in granular soil without a wedge, but with a gage tower. It steers fastest in soil with both features.

Placement of the mass in the hammer/sonde housing assembly is important. To place the mass centroid biased to the gage tower side of the hammer axis would be deleterious. To place it on center is acceptable. To place it biased away from the gage tower is advantageous. The reaction of the off center mass will enhance the desired deflection of the hammer, thereby increasing the maximum rate of steer that can be achieved. Since the hammer 16 is essentially symmetrical in its mass distribution, the center of mass of the drill head 10 can be most readily adjusted by offsetting the sonde housing 14 and optionally the starter rod 12 away from the gage tower to shift the center of mass of drill head 10 in a favorable direction.

Rotation angle effects the rate of steering. Smaller rotation angles create a more eccentric bore shape and increase the rate of steering. However, small rotation angles also create smaller bores than large rotation angles and can make it difficult to pull the hammer backwards out of the bore.

In general, more eccentric bit designs will steer faster than less eccentric designs. The limit to eccentricity is the challenge created by passing the bending moment from the slidable bit shaft to the hammer body. A more eccentric bit has a large moment and increased potential for galling on the sliding joint. The existence of this moment resulted in incorporating a wide bearing surface on the bit shaft splines as well as a secondary bearing behind the splines.

The drill head of the invention is unique in that the operator can cause the bore path to deviate at will (or go straight) despite the difficulties that solid rock presents when compared to compressible material such as soil. A combination of motions produces either steering or straight boring. The operating characteristics of the hammer combined with the geometry of the head are utilized along with various rotational motions to direct the hammer.

Boring straight is the easiest of the directions to achieve. With compressed air supplied through the drill string in the range of 80-350 psi, a thrust force is applied to the hammer. The thrust force reacts against the face of the hammer and counteracts the pneumatic force that has extended the reciprocating head. The hammer and drill string must travel forward, compressing the head approx. ½ to 1" toward the hammer. This change in position of the head relative to the hammer shifts internal valving and starts the tool impacting. Typically only slightly more pressure is applied to the hammer than it takes to get it started.

To bore straight, the operator rotates the drill continuously about the drill string axis. Speed is typically from 5 to 200 RPM. Maximum productivity is a function of hammer rate, usually from 500 to 1200 impacts/minute as well as rotation speed. The ideal rate is that which causes the tungsten carbide buttons to sequentially impact ½ of their diameter (typical button dia. being ½") away (tangentially) from the previous impact. In this example, a 6" diameter bore hole created by a hammer with 700 impacts per minute should rotate at per the calculations shown: button dia=0.50", ½ button dia=0.25", circumference=6.0"*π=18.84", rotation per impact=0.25"/18.84"*360 deg=4.78 degrees, degrees*700 impacts/minute=3346 deg/min, 3346/360=9.3 RPM. Most often the speed is higher than this. When the button pattern center is eccentric to the drill head center, a round hole is cut about the theoretical cut axis. This axis is located midway between the outermost gage cutter and the bottom of the steer plane (heel).

Boring an arc (steering) requires a more sophisticated motion than going straight. This explanation assumes steering upwards from a nominally horizontal bore axis. Any direction can be achieved by reorienting the midpoint of the steering motion. To steer up, the gage cutters must be oriented at the top, and the steer plane or heel is located at the bottom. Imagining the face of a clock placed on the front of the bore face, the operator starts with the gage buttons at 8 o'clock. The drill string is thrust into the bore face thereby actuating the hammer. Once running, the drill string is rotated clockwise at a rate preferably matching the ideal rate for boring straight. This rotation continues for 8 hours of the clock face until the gage buttons reach 4 o'clock. At that point the hammer is retracted far enough to pull the buttons off the face of the bore, thereby stopping the hammer. The drill string is rotated counterclockwise to 8 o'clock and the process is repeated, or one of the other methods for returning to the starting point described above may be used.

This method, know as shelving, will cut a shape that is approximately circular, but with a sliver of rock remaining on the bottom. That sliver is the shelf. The process is repeated many times, progress per 4 hour clock cycle may be 0.20". With a cycle rate of 30 times/minute, progress would be 6"/minute. The bore profile with the semi-circular face continues to cut straight until the steer plane (cone) contacts the shelf. This sliver of shelf forces the profile to raise as continued progress is made. The sliver as shown in a 6" bore has a height of 0.12". The steer plane, at 12 degrees of angle off the axis rides this sliver or shelf upwards 0.12" over approximately 0.57" of forward travel. The bit again cuts straight with its semi-circular profile for a distance of approximately 2.5" until the steer plane again contacts the shelf.

Figure 16:
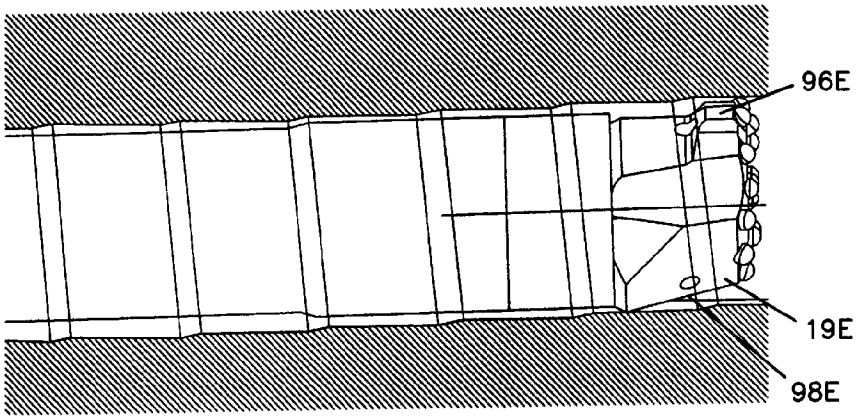
FIG. 16 is a side view of a fourth alternative bit according to the invention, with the rest of the tool omitted, showing the steering action in rock.
Figure 17:
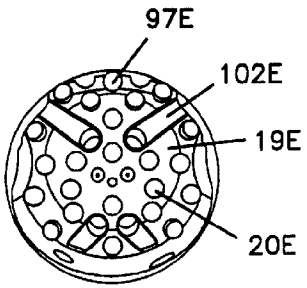
FIG. 17 is a front view of the bit of FIG. 16.
Figure 19:
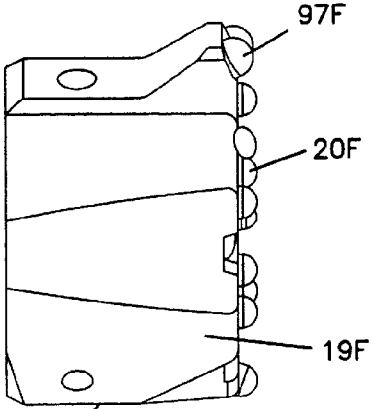
FIG. 19 is a side view of the bit of FIG. 18.
Figure 20:
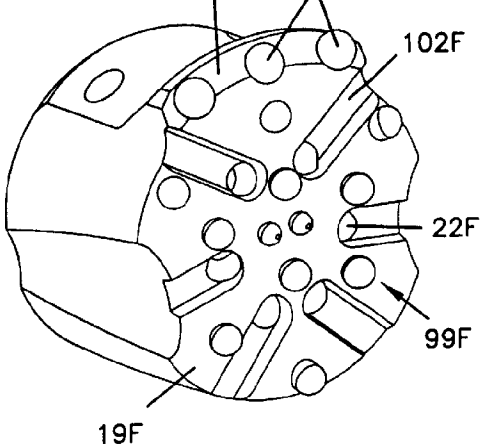
FIG. 20 is a perspective view of the bit of FIG. 18.

This process is a stair step operation with tapered risers ad straight steps of the kind shown in FIG. 16. The action of the shelf not only changes the elevation of the drill head, but also helps it to change angular inclination. The rear of the drill string (approximately 30" to the rear of the face) acts as a fulcrum or pivot point. Raising the front of the hammer without raising the rear causes it to tip up. With enough change in direction, the operator can now bore straight having made the steering correction. The drill head changes direction by 3 degrees in only 32" of travel, a figure that would be acceptable even in compressible media.

The foregoing steering method is most effective in rock but may also be used in soil or other loose media. In addition, steering in soil may also be accomplished using the technique of stopping rotation of the bit and relying on the heel area on the side of the bit to cause deviation in the desired direction. As noted above, it is most effective to continue running the hammer when steering in this fashion.

Because the disruption created by the process of the invention is minimal, the expense involved in restoring the job site is often minimal. A bore can be created beneath a multi-lane divided highway while the road is in use, even if solid rock is encountered during the bore. No disruption or traffic control is needed as the equipment can be set back from the highway's edge, no explosives are used, the drill head location is tracked constantly during drilling and no heavy equipment needs to cross to the opposite side of the road. The bore can be started at the surface and may be completed by exiting the rock surface at the target point. In addition, if it is necessary to travel through sand or soil in order to reach the rock formation, the drill head of the invention permits steering under such conditions.

ALTERNATIVE EMBODIMENT

In an alternative embodiment, the percussion hammer according to the present invention may be operable with a liquid medium for power transfer to the active portion of the drill. The liquid medium can comprise aqueous and non-aqueous fluids (e.g., drilling fluid solutions, dispersions or muds) rather than a compressible fluid (e.g., air). Such hydraulic drive fluids used to operate the liquid driven hammers can include aqueous and non-aqueous liquids which can be formulated with additives for a variety of useful properties. In drilling or boring operations that already include a supply of drilling liquid (generally known as drilling mud) to aid in the drilling or boring operation, it is preferred to use such drilling liquid for transferring the working pressure to drive a liquid driven hammer. However, separately conducted hydraulic drive fluids may also be used to operate the liquid driven hammer.

Aqueous based liquids suitable for driving a liquid driven hammer include water solutions or dispersions with certain types of materials, such as a synthetic polymer material or a natural or synthetic clay, that are known to have expansion and lubricating characteristics, for example, a bentonite. Other aqueous based liquids that may be used to drive the liquid driven hammer include water based drilling fluids containing CaO, $CaCO_3$, lime and potassium compounds and similar inorganic materials. Fluids can incorporate small amounts of polymeric materials including preferred unmodified polymeric additives and sulfonated polymers such as styrene-maleic anhydride copolymer and at least one water-soluble polymer prepared from acrylic acid, acrylamide or their derivatives. Still other aqueous drilling fluids include water combined with gelling agents, defoamers and glycerines selected from the group consisting of glycerine, polyglycerine and mixtures thereof. Others include invert emulsion drilling fluids. Polymeric based fluids can be formulated with organic or carbohydrate thickeners including, for example: cellulose compounds, polyacrylamides, natural galactomannans and various other polysaccharides.

Non-aqueous based liquids suitable for driving the liquid driven hammer 216 include synthetic fluids including polyglycols, synthetic hydrocarbon fluids, organic esters, phosphate esters and silicones.

It is to be understood, however, that aqueous and non-aqueous based liquids for driving the liquid driven hammer are not limited to those recite above. Those skilled in the art will recognize that other liquids may be used for drilling fluids and driving a piston hammer without departing from the scope of the invention.

A percussion hammer driven with liquid provides several additional features and advantages compared with a pneumatic percussion hammer. For example, a liquid driven hammer may be operated at working pressures of about 800 to 2000 psi, rather than the typical 80-350 psi range generally used with compressed air pneumatic hammers. The capability of operating the liquid driven hammers at higher working pressures provides higher energy capability of the percussion hammer and, therefore, provides an increase in the working energy available for drilling or boring.

As noted above, the maximum working pressures that are conventionally used for driving pneumatic hammers are limited to about 300 to 500 psi. This relatively lower working pressure limitation of the pneumatic hammers is a result, in part, from the potential safety hazard that is inherent when operating with compressible fluids. For example, operating at working pressures of several hundred psi (and higher) carries with it the potential of an explosion resulting from a pressure line failure. To overcome these potential safety problems, therefore, the pneumatic hammers are generally limited to a maximum working pressure of about 300 to 500 psi.

Furthermore, since the energy of a pneumatic driven hammer is proportional to the square of its velocity and the velocity is proportional to the working pressure, the energy available for drilling is proportional to the square of the working pressure. Accordingly, any limitation imposed on the working pressure of the pneumatic driven hammer directly results in a limitation of the working energy available for drilling or boring.

Another feature of the liquid driven percussion hammer is a relatively higher energy transfer efficiency over the pneumatic driven hammer. For example, since the compressibility of liquids is virtually zero and can be ignored in most practical applications, the energy loss in a liquid driven hammer due to heat conversion as a result of compressibility is practically zero. This is in contrast, however, to the pneumatic driven hammers which lose energy efficiency due to the compressibility of the fluid being used to drive the hammers. As an example, as the pneumatic fluid heats up during compression, that heat is later dissipated into the environment and thus reduces the pneumatic hammer's energy efficiency.

Moreover, during drilling or boring, the liquid fluid used to operate the liquid driven hammer does not lose pressurization since the passages for conducting the liquid to the hammer remain filled. This is not the case with pneumatic hammers where, as each new pipe segment is added to a drill string, the pneumatic fluid line generally becomes de-pressurized. Accordingly, prior to continuing a drilling or boring operation, the volume in the pneumatic fluid line must be re-pressurized. It will be appreciated that the need to repressurize the line becomes more troublesome as the number of drill rods in the drill string increases.

Yet another feature of the liquid driven hammer is the capability of carrying away cuttings from the front portion of the drill string around the drill bit that result from the drilling operation. Spent liquid fluid made to exit the drill bit through passages provided thereon for such a purpose, provides an effective way of carrying away the drilling cuttings from in front of the drill head. In contrast, the spent air used in pneumatic driven hammers is not as effective at carrying away the drilling cuttings as the spent liquid.

It will be appreciated by those skilled in the art that the liquid driven hammer 216 (see FIG. 22) generally operates under the same principles as discussed above in reference to the pneumatic hammer 16. Also as discussed above, each hammer type, whether pneumatic or liquid driven, provides distinct advantages unique to the medium that is used for driving the hammer (e.g., compressible fluids versus liquids). Accordingly, in one embodiment of the invention, the pneumatic hammer 16 may be substituted with a liquid driven hammer 100 (see FIGS. 21 and 22), 400 (see FIGS. 23 and 24) or 216 (see FIG. 25). For example, the liquid driven hammer 100, 400 and 216 may be driven with drilling liquid or any other hydraulic drive fluid that is generally well known by those skilled in the art without departing from the scope of the invention.

Those skilled in the art will appreciate that a liquid driven hammer according to the present invention may be of the types already known in the art. For example, a liquid driven hammer may be of the type disclosed by U.S. Pat. No. 5,715,897 to Gustafsson, U.S. Pat. No. 5,785,995 to Eckwall, U.S. Pat. No. 5,107,944 to Gustafsson and/or U.S. Pat. No. 5,014,796 to Gustafsson which are hereby incorporated by reference in their entirety. Those of skill in the art will appreciate, however, that the hammer(s) disclosed in the preceding references were not steerable, did not include a sonde and were not used in a horizontal drilling application.

In general, liquid driven hammers, as well as other fluid hammers, require certain levels of working pressure and flow to activate the hammer. In addition, the liquid driven hammers require a force (e.g., a thrust force generated by a drive member of a horizontal directional drilling machine) against a drill bit that reacts against a piston of the hammer. In the absence of this force, the hammer will not activate, independent of the pressure or flow applied to the hammer.

The design of a liquid driven hammer may be modified to vary the relationship between these parameters (e.g., thrust force and working pressure). Accordingly, a liquid. driven hammer may be designed to allow working pressure transferred through a liquid to be applied to the hammer in the absence of any thrust force on the drill bit and subsequently enable to the liquid driven hammer to activate upon a subsequent application of a nominal force against the drill bit. This design will subsequently be referred to as a standard (NIN) type liquid driven hammer design.

An example of a standard type NIN liquid driven hammer is manufactured by G-Drill AB of Sweden which is commercially available under the designation Water Powered ITH Hammer WASSARA W100 and W100S. The standard type NIN liquid driven hammer referred to herein is generally designed to be operated with relatively clean water as the driving liquid. It will be appreciated that when using drilling liquid for driving the hammer, the standard type NIN liquid driven hammer may be modified. For example, the internal clearances and materials used for constructing the NIN hammer may be modified such that the hammer operates properly with the relatively higher viscosity and the relatively higher levels of contaminants generally found in drilling liquids.

Figure 21:
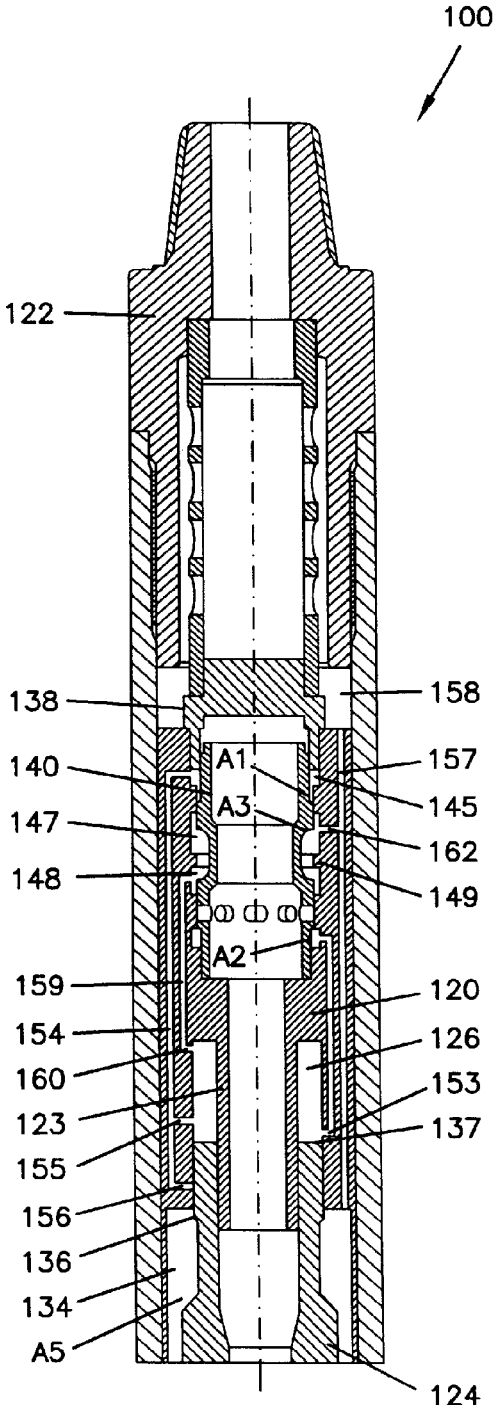
FIG. 21 is a partial sectional view of the rear longitudinal portion of an embodiment of a hydraulic rock drilling machine.
Figure 22:
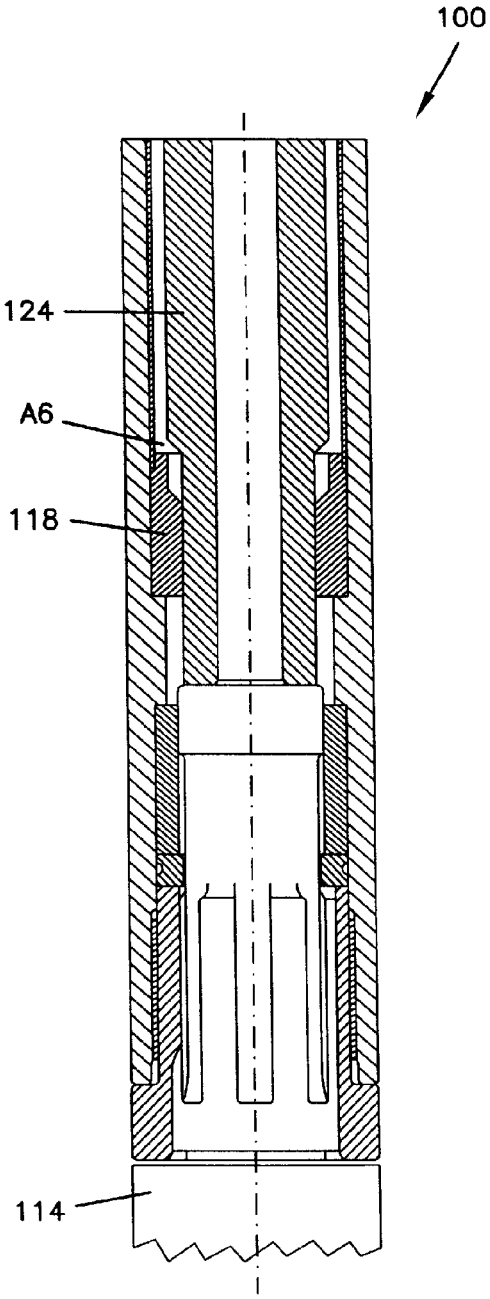
FIG. 22 is a partial sectional view of the forward longitudinal portion of the embodiment of a hydraulic rock drilling machine.

FIGS. 21 and 22 illustrate an example of a standard type NIN liquid driven hammer, generally at 100. A brief summary of the hammer 100 will be presented herein. However, for a more detailed description of the hammer, reference may be had to U.S. Pat. No. 5,715,897 to Gustafsson.

During operation of the hydraulic impact motor in the embodiment shown in FIGS. 21 and 22, pressurization of the rear drive chamber 126 causes the piston hammer 124 to move in its forward stroke via pressurization of the piston area 137. Depressurization of the rear drive chamber 126 causes the piston hammer 124 to move in its return stroke. The return stroke is generated by the continuously pressurized front drive chamber 134 acting on piston area 136.

The pressurization and depressurization of rear drive chamber 126 is controlled by the position of the spool valve 140. The spool valve 140 has two operating positions. The first operating position is shown in FIG. 21, and pressurizes the rear drive chamber 126. The second operating position (not shown) has the spool valve 140 displaced rearward against the back head 138. This position causes the rear drive chamber 126 and control surfaces A1 and A2 to be depressurized. Because of the continuous bias pressure on control surface A3, the spool valve 140 remains, in the second operating position despite depressurization of control surfaces A1 and A2.

The cyclic movement of the spool valve 140 from the first operating position to the second operating position is controlled by the position of the piston hammer 124. When the piston hammer 124 has moved forward to strike the drill bit 114, the control surface A2 is pressurized to move the spool valve 140 to its second operating position, depressurizing control surface A2. When the piston hammer 124 has reached the limit of its return stroke, control surface A1 is pressurized to move the spool valve 140 to its first operating position.

At startup, it is assumed the machine is in an initial depressurized state. Pressurized water enters the machine via backhead 122 and pressurizes annular space 158 as described above. A number of parallel channels 157 lead axially through the valve housing 120 and connect front drive chamber 134 with space 158. Hence the front drive chamber 134 is essentially immediately pressurized at startup. Similarly, a number of channels connect a row of ports 162 into the annular chamber 147 with the pressurized space 158 to essentially immediately pressurize chamber 147 at startup.

At startup, it cannot be assumed the spool valve 140 or the piston hammer 124 are in any particular configuration. Therefore, different configuration states will be analyzed, each assuming the machine now has a pressurized front drive chamber 134 and a pressurized annular chamber 147 as described in the preceding paragraph.

Further, the limiting axial positions of the piston hammer 124 can preferably be defined. Rearward travel of the piston hammer 124 can be limited by interference with tube 123, and be limited, so that port 160 preferably remains open. Alternatively, rearward travel of the piston hammer 124 can be limited by interference of the valve housing 120 with surface A5. Or rearward travel of the piston hammer 124 can be limited by interference of the valve housing 120 with surface 137, effectively closing rear drive chamber 126 and closing port 160. Leakage of hydraulic fluid from port 160 into the rear drive chamber 126 could then pressurize piston area 137 as needed.

Forward travel of the piston hammer 124 can be limited by impact with the target, the drill bit 114 (as shown in FIG. 22). At this forward limit, a clearance can exist between surface A6 and guide bearing 118, and the piston area of surface A6, assuring the piston area of surface A6 can be pressurized at startup.

First, assume the spool valve 140 at startup is in the forward position shown in FIG. 22. Annular chamber 147 is in communication with annular chamber 148, and via port 162, passage 159, and port 160, rear drive chamber 126 will be pressurized.

If the piston hammer 124 is at its rearward limit of travel (not show), ports 153 and 155 would be closed. Port 156 would be open. The open port 156 communicates with front drive chamber 134 and would pressurize piston area A1 via channel 154 and annular chamber 145, keeping spool valve 140 in its forward position. Pressurization of rear drive chamber 126 will start the piston hammer 124 on its forward stroke, beginning the operating cycle.

If the piston hammer 124 is in an intermediate axial position (with port 153 closed), ports 155 and 156 may be open or closed at startup. If either port 155 or 156 is open, then piston area A1 would be pressurized, either by the front drive chamber 134 via port 156 or by the rear drive chamber 126 via port 155. Spool valve 140 would thereby be kept in its forward position, and piston hammer 124 will complete its forward stroke, beginning the operating cycle.

If ports 155 and 156 are closed at startup, pressurization of rear drive chamber 126 will start the piston hammer 124 forward. Port 155 would subsequently open during the initial forward stroke, pressurizing piston area A1 as in the regular operating cycle.

If the piston hammer is at or near its forward limit of travel, ports 153 and 155 will be open at startup. Pressurization of rear drive chamber 126 would pressurize piston area A1 (via port 155), and would pressurize piston A2 (via port 153). Spool valve 140 would be displaced to its rearward position, depressurizing the rear drive chamber 126 and allowing the piston hammer 124 to begin a rear stroke via pressurization of piston area 136.

Next, assume the spool valve 140 is at an intermediate position between its forward and rear stable positions. If spool valve 140 is sufficiently forward such that annular chamber 147 and annular chamber 148 remain in communication, then the startup process will be identical to that described for the spool valve 140 being fully forward as described previously above.

If spool valve 140 is at or near the rear stable position, then shoulder 149 prevents communication between annular chamber 147 and annular chamber 148. Hence, rear drive chamber 126 will not be immediately pressurized at startup.

If the piston hammer 124 is at its rearward limit of travel (not shown), ports 153 and 155 would be closed. Port 156 would be open. The open port 156 communicates with front drive chamber 134 and would pressurize piston area A1 via channel 154 and annular chamber 145, driving the spool valve 140 to its forward stable position. Annular chamber 148 would now communicate with annular chamber 147, pressurizing rear drive chamber 126. Pressurization of rear drive chamber 126 will start the piston hammer 124 on its forward stroke, beginning the operating cycle.

If the piston hammer 124 is in an intermediate axial position (with port 153 closed), ports 155 and 156 may be open or closed at startup. If either port 155 or 156 is open, then piston area A1 would be pressurized, either by the front drive chamber 134 via port 156 or by the rear drive chamber 126 via port 155. Spool valve 140 would thereby be driven to its forward stable position, and piston hammer 124 will complete its forward stroke, beginning at the operating cycle.

If ports 155 and 156 are closed at startup, pressurization of front drive chamber 134 will start the piston hammer 124 rearward to begin the operating cycle (rear drive chamber 126 would not yet be pressurized). Port 156 would subsequently open during the initial rearward stroke, pressurizing piston area A1 as in the regular operating cycle.

If the piston hammer 124 is at or near its forward limit of travel, ports 153 and 155 will be open at startup. However, rear drive chamber 126 would not be pressurized, so pressurization of front drive chamber 134 will start the piston hammer 124 rearward to begin the operating cycle.

It will appreciated, that the standard type NIN hammer described above, is manufactured under the designation Water Powered ITH Hammer WASSARA model number W100/W100S. This hammer includes the feature that when no force is acting on the drill bit 114, and pressure is applied to the piston hammer 124, the pressurized liquid flushes out of the channel through the piston hammer 124.

One example of the limits of operation of a standard type NIN liquid driven hammer, for example the Water Powered ITH Hammer WASSARA model number W100/W100S described above, is set forth in the following TABLE 1.

TABLE 1

| With a force applied to the drill bit of at least 300-500 lbs., liquid flow required to activate the hammer will be 15 to 20 Gallons per Minute (gpm): |
|---|
| 1) If it is desirable to NOT ACTIVATE the hammer, the liquid flow will be limited to:<br>a) When the force acting on the drill bit is within about 0 to 500 lbs., the flow rate must be set to about 10 to 15 gpm;<br>b) When the force acting on the drill bit is greater than about 500 lbs., the maximum flow rate should be set to a Maximum Flow Rate (gpm) = 0.03 × Force (lbs.);<br>2) If it is desirable to ACTIVATE the hammer, the liquid flow rate should be set to a minimum flow rate of:<br>a) Minimum Flow Rate (gpm) = 0.03 × Force (lbs.). |

Alternatively, it will be appreciated that it is possible to design a liquid driven hammer such that the hammer will not operate in the absence of any force acting on the drill bit. This is generally referred to as a flushing position. As such, when the hammer is in the flushing position, the application of a force to the drill bit that is within a normal range of operation will not activate the hammer. This design will subsequently be referred to as an aggressive flushing type GIN design, an example of which is illustrated in U.S. Pat. No. 5,014,796 to Gustafsson.

An aggressive flushing type GIN liquid driven hammer is manufactured by G-Drill AB of Sweden which is commercially available as under the model designation GIN W100/W100S "G2". As discussed above in reference to the standard type NIN liquid driven hammer, the aggressive flushing type GIN liquid driven hammer referred to herein is generally also designed to be operated with relatively clean water as the driving liquid. It will be appreciated that when using drilling liquid for driving the hammer, the standard type GIN liquid driven hammer may be modified. For example, the internal clearances and materials used for constructing the GIN hammer may be modified such that the hammer operates properly with the relatively higher viscosity and the relatively higher levels of contaminants generally found in drilling liquid.

Figure 23A:
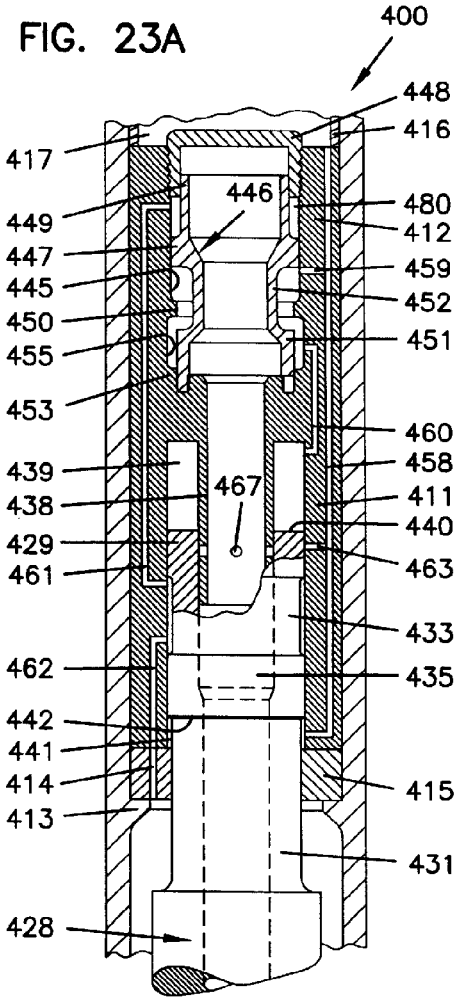
FIG. 23a and FIG. 23b show fragmentary longitudinal sections of the rearward and forward parts respectively, of a first embodiment of a rock drill with a hammer located in a forward position.
Figure 24:
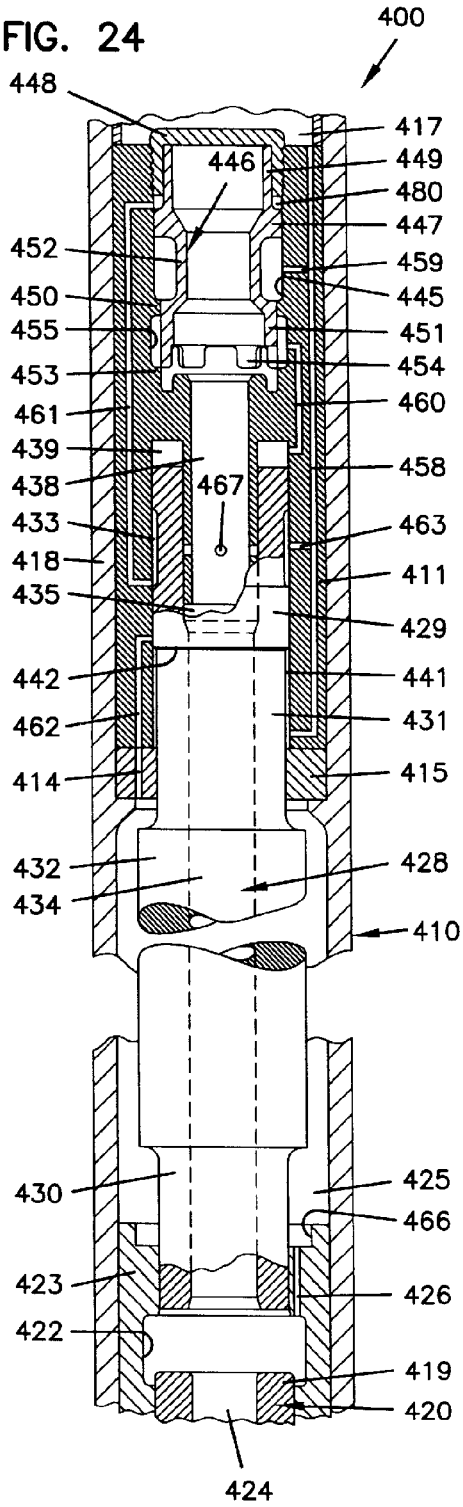
FIG. 24 is a shortened fragmentary sectional view corresponding to those of FIGS. 23a and 23b with the hammer disposed in a rearward position.
Figure 23B:
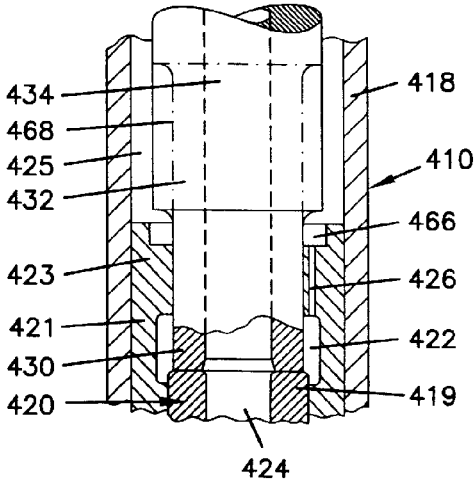

FIGS. 23a, 23b and 24 illustrate an aggressive flushing type GIN liquid driven hammer, shown generally at 400. While a brief description of the hammer 400 will be presented herein, a further description of the hammer 400 may be found in U.S. Pat. No. 5,014,796 to Gustafsson. Referring now to FIGS. 23a and 23b, there is shown a casing 418 of a rock drill 410 consisting of an elongated cylindrical tube typically of relatively even thickness which has an internal annular abutment 413. A cylinder 411, preferably integral with a valve chest 412, is received in the casing 418 and is supported by radially divided ring structure 414 and 415 that rests against abutment 413. The cylinder 411 is fixed axially in the casing 418 by a tubular liner 416 extending between the rear face of the valve chest 412 and a backhead, not shown. Liner 416 is fixedly threaded to a rear portion of the casing 418 and is adapted to transmit rotation to the casing 418 in a conventional manner.

The interior of the liner 418 forms a port 417, usually supplied with usual drill tubes that employ high pressure liquid, preferably water. The water is supplied via the backhead and port and serves to drive the down-the-hole drill.

As fragmentarily shown in FIG. 23b, a drill bit 420 is slidably received and retained in a collar 421 threaded to the forward end of the casing 418. An anvil 419 of the drill bit 420 protrudes in an annular groove 422 of the collar 421. Rearwardly of the groove 422 there is provided a guide bearing 423 in the collar 421. The drill bit 420 has the usual through flushing channel 424 therein leading to its working end, and the usual splined connection (not shown) is provided between the collar 421 and the drill bit 420 whereby rotation is transmitted thereto from the casing 418.

An elongated chamber 425 is formed by the casing 418 extends between the guide bearing 423 of the drill bit collar 421 and the divided ring structure 414 and 415 of the cylinder 411. The chamber 425 is kept permanently at low liquid pressure i.e. relief pressure thanks to one or more relief passages 426 connecting the chamber 425 with the annular groove 422 that communicates with the flushing channel 424 in the drill bit 420.

A hammer 428 is reciprocable in the casing 418 for repeatedly delivering impacts to the anvil 419 of the drill bit 420. On the rear portion and preferably at the rear end of the hammer 428 is provided a driving piston 429. The impacting frontal end of the hammer 428 is formed as a journal 430 slidingly received in the guide bearing 423 of the collar 421. A cylindrical enlarged hammer portion 432 is reciprocably provided in the chamber 425. The diametric enlargement 432 serves to increase the impact energy of the hammer 428 and has a sufficient clearance within the chamber 425 for allowing substantially unhindered movement of low pressure liquid between the ends of the chamber 425 when the hammer 428 is reciprocating.

A reduced throat 431 is provided between the piston 429 and the enlarged hammer portion 432 and preferably has a diameter equal to the diameter of the journal 430. The throat 431 is sealingly surrounded by the radially divided ring structure 414, 415 and is freely reciprocable therein.

An axial flushing channel 434 extends centrally through the hammer 428 and has at its rear an enlarged bore 435 within the piston 429 which is sealingly slidable on a central low pressure or relief duct 438 coaxially forming part of or affixed to the cylinder 411. The duct 438 is in open communication with the central piston channel 434 and with the interior of the valve chest 412.

The piston 429 is slidingly and sealingly received in the cylinder 411 forming a drive chamber 439 therein faced by the rear end surface 440 of the piston 429 which chamber 439 serves to drive the hammer 428 forwardly in its working stroke.

Around the reduced throat 431 is provided an opposite cylinder chamber 441 faced by an annular opposite drive surface 442 which is smaller than the drive surface 440 and is adapted to force the piston 429 rearwardly to perform a return stroke of the hammer 428.

The valve chest 412 has an axial bore 445 in which a tubular control valve 446 (preferably a spool valve) is reciprocable. The interior of the control valve 446 is permanently open to the duct 438 and thus maintained at the low liquid pressure of the flushing channels 434 and 424. The control valve 446 has a differential piston 447 sealingly and slidably received in the axial bore 445, which is closed by a cap 448 threaded to the chest 412. The cap 448 slidingly and sealingly receives therein an upper skirt 449 of the control valve 446. The opposite end to the control valve forms a lower skirt 451. A reduced waist 452 is provided between the lower skirt 451 and the differential piston 447. The outer diameter of the lower skirt 451 is somewhat larger than the outer diameter of the upper skirt 449 and somewhat smaller than the diameter of the bore 445. The bore 445 is terminated by an intermediate land 450. Protruding guiding tags 454 (see FIG. 24) are provided on the axial face of the lower skirt 451 and serve as guides when the control valve 446 reciprocates between the position in FIG. 23a, in which the lower skirt 451 seals against the lower land 453 and the position in FIG. 24, in which the lower skirt 451 seals against the intermediate land 450.

Liquid passages 458 connect via branch passages 459 the high pressure port 417 with the valve bore 445 to provide a permanent underside pressure on differential valve piston 447 whereby control valve 446 is biased towards the rear position shown in FIG. 24. Liquid passages 460 connect the upper part of the drive cylinder chamber 439 with the annular internal groove 455 in the valve chest 412.

In operation, the control valve 446 is adapted to reciprocate in response to movement of the hammer 428 more specifically in response to the position of the control groove 433 on the piston 429 thereof. To this end, control passages 461, as shown in FIGS. 23a and 24, extend to connect a control chamber 480 located at the upper end of the valve bore 445 with the cylinder wall between chambers 439 and 441. These chambers are aligned with the piston control groove 433, which, as shown in the FIG. 23a position, connects control passages 461 to liquid passages 462 that lead to low pressure chamber 425. with relief of the upper end of valve bore 445 the above-mentioned upward valve bias brings the control valve 446 up to its FIG. 24 position wherein the lower valve skirt 451 seals against the intermediate land 450.

Thus, when the hammer 428 in FIG. 23b impacts on the anvil 419 and the upper end of the valve bore 445 is relieved, the high pressure transmitted from port 417 via passages 458 and 459 to the lower end of the valve bore 445 brings control valve 446 to the FIG. 24 position. At this instant and until the hammer 428 under its upward bias has moved to the FIG. 24 position, the drive chamber 439 will be emptied to duct 438 via the passages 460 and the open lower land 453. The escaping liquid is directed thriugh channels 434 and 424 to flush the hole drilled in the rock by drill bit 420.

When reaching the rear position in FIG. 24, the control groove 433 of the piston 429 connects branch passages 463 from high pressure passages 458 to the passages 461. This pressurizes the end of valve bore 445. Due to the difference in diameters between the valve skirts 449 and 451, the rear surface of differential valve piston 447 is larger than the opposite net surface producing the permanent rearward bias on the valve piston 447, and as a consequence the control valve is brought back to the FIG. 23a position. Herein, the intermediate valve land 450 is opened and the drive cylinder chamber 439 is connected to high liquid pressure via passages 458 and 459, valve waist 452 and passages 460. As a consequence the hammer 428 is urged to perform its working stroke so as to impact on the anvil 419 of the drill bit, see FIG. 23b. The above described operation is then repeated.

In an uplifted position of the rock drill, the drill bit 420 will sink forwardly somewhat from the position shown in FIG. 23b. The enlarged portion 432 of the hammer 428 at such instant is caught and the hammer arrested and lowered to a forward bore 66 in chamber 425. Simultaneously, the high pressure branch passages 463 are opened to drive chamber 439. Chamber 439 is relieved for intensive liquid flushing via bores 467 (provided in the wall duct 438) into the duct 438 for purposes of varying the impact energy of the subject rock drill.

Chamber 425 can be combined with hammers having enlarged portions 432 of varying length. Such a possibility is indicated by phantom lines for a hammer.468 in FIG. 23b.

Water can be delivered to port 417 on the order of 180 bar (18 MPa). Varying liquid demand during hammer reciprocation is normally equalized by compression and re-expansion of the water column in the tubing supplying rock drill 410 with liquid, whereby use of down-hole gas-loaded accumulators is avoided.

With a water pressure of 180 bar (18 MPa) and a drill casing diameter of 96 mm, for example, the novel valve design permits one an impact energy of about 25-30 kW and a blow frequency near 60 Hertz. Water consumption of about 150-200 liters/minute produces a flushing water speed of more than 0.6 meters/sec, which at an attained hole diameter of 116 mm is sufficient for efficiently lifting away debris at vertical drilling.

It will appreciated, that the standard type GIN hammer described above includes the feature that when no force is acting on the drill bit 420, and pressure is applied to the piston hammer 428, the pressurized liquid flushes out of the channel through the piston hammer 428.

One example of the limits of operation of a standard type GIN liquid driven hammer, for example the model number GIN W100/W100S "G2" described above, is set forth in the following TABLE 2.

TABLE 2

1) If it is desirable to NOT ACTIVATE the hammer, the following sequence is performed:
   a) Reduce the force to approximately zero;
   b) Apply liquid flow at a rate of 15 gpm to the liquid hammer, resulting in the hammer shifting into the flushing position;
   c) From then on control the liquid flow rate and thrust force acting on the drill bit such that:
      The Minimum Flow Rate (gpm) = .025 × force (lbs.); or
      The Maximum Force (lbs.) = 40 × flow rate (gpm).
2) If it is desirable to ACTIVATE the hammer, the following sequence is performed:
   a) Reduce the liquid flow rate to the hammer to approximately zero;
   b) Apply force of minimum 500 lbs.
   c) Apply liquid flow of minimum of 15 gpm;
   d) From then on control such that:
      The Minimum Force (lbs.) = 40 × flow rate (gpm); or
      The Maximum Flow Rate (gpm) = .025 × force (lbs.).

Figure 25:
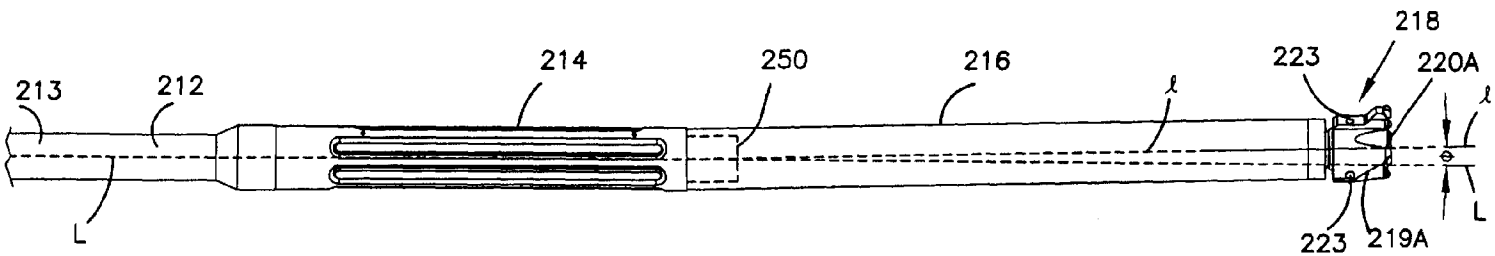
FIG. 25 is a sectional view of one embodiment of a drill head according to the present invention.

Referring now to FIG. 25, in one embodiment, a drill head 210 which is constructed in accordance with the principles of the present invention includes, as general components, a sonde holder/housing 214, a liquid driven hammer 216 and bit assembly 218 connected head to tail as shown. The drill head 210 may also include a starter rod 212. The starter rod 212 connects at a rear portion 213 to a conventional drill string driven by a directional boring machine. In one embodiment, drilling liquid is fed through the drill string, the starter rod 212 and through a passage in the sonde holder 214. The liquid is also used to drive the liquid driven hammer 216.

Bit assembly 218 includes a drill bit 219A having an array of cutting teeth 220A and a bit shaft 221A (see FIG. 25B) which is used to mount the drill bit 219A onto the front end of the liquid driven hammer 216. Drill bit 219A is removably mounted to the shaft 221A by means of roll pins inserted through transverse holes 223. In one embodiment of the invention, angled ports 222A (see FIG. 25B) are provided in the drill bit assembly 218 for ejecting spent liquid from the liquid driven hammer 216 out of the front portion of the drill bit 219A. The drilling liquid exiting the angled ports 222A is used to carry away drilling cuttings comprised of soil and/or rock chips from the drill bit's path.

In one embodiment, a drill head 210 having a sonde holder 214 is provided, wherein the sonde holder 214 is includes a coupling member. In one embodiment of the invention the coupling member is a threaded member 250 which is adapted to couple to a threaded end of the liquid driven hammer 216. It will be appreciated that, as discussed above, a splined connection may be used to connect the sonde holder 214 at either end to the liquid driven hammer 216 and the starter rod 212. The same type of roll pin connection, omitting splines, may be used to mount drill bit 219A onto the shaft 221A.

Figure 25B:
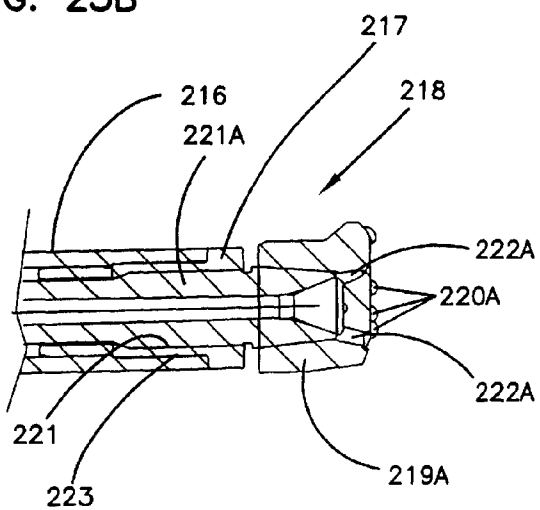
FIG. 25B is a sectional view of a drill bit assembly according to the present invention.
Figure 25A:
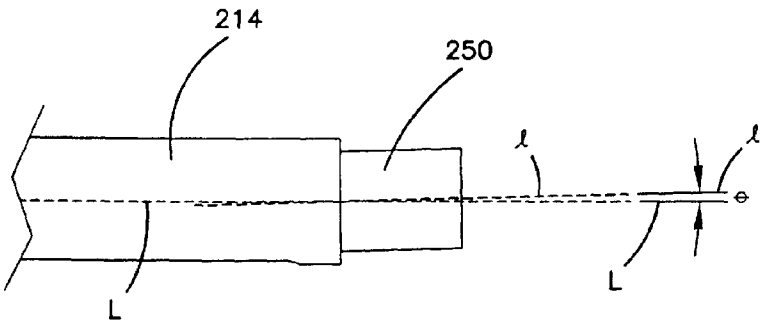
FIG. 25A shows an enlarged view of a portion of a drill head according to the present invention.

Still referring to FIGS. 25 and 25A, the threaded end 250 is provided such that a center line or longitudinal axis "l" of the threaded end 250 (the bent axis) defines an angle θ with the longitudinal axis "L" of the drill string. The angle θ may vary from about 0.5° to about 2.0°, and is generally about 1.5°. However, it will be appreciated that the angle θ is limited by the fact that the drill head 210 may be used for drilling or boring through both solid rock and compressible soils. In other words, when drilling in solid rock the angle of the bent axis cannot exceed a predetermined value so that the drill head 210 does not become stuck in the bore. It will also be appreciated that the mean longitudinal axis L of the drill string may be generally established near or at the sonde holder 214 and starter rod 212.

The liquid driven hammer 216 is coupled to sonde holder 214 such that the length of the liquid driven hammer 216 makes an angle θ with the longitudinal axis "L" of the drill string. The angle θ provides an offset (or bent axis) to steer the drill head 210. Those skilled in the art will readily recognize that the pneumatic hammer 216 may also be connected to the threaded end 250 of the sonde holder 214 in a similar fashion.

In drilling or boring in compressible material such as soil, the operator may deflect or steer the drill head 210 away from a straight path, in a desired direction of deviation, by utilizing the bent axis formed by the sonde holder 210 and the liquid driven hammer 216. For example, while drilling or boring in soil along a substantially horizontal direction it may be desired to deflect the drill head 210 in a generally upwardly direction. This may be accomplished by first rotating the entire drill string such that the portion of the liquid driven hammer 216 which extends furthest from the longitudinal axis "L" of the drill string is directed towards the desired direction of deflection. Upon placing the drill head 210 in the proper deflection orientation, the drill head 210 is advanced by inducing drilling forces from the directional boring machine. Accordingly, the path of the drill head 210 deviates according to the orientation of the liquid driven hammer 216. This steering operation is similar to that used when the drill head is equipped with a bent piece for deflecting or steering the drill string.

It will be appreciated by those skilled in the art that the drill head 210 may be deflected or steered in the desired direction by using a variety of techniques depending upon the properties of the medium being bored. For example, for the purposes of deflecting or steering the drill head 210 when drilling or boring through compressible soil, the drill head 210 is generally not rotated and the liquid driven hammer 216 may or may not be operated. Other soil types, however, have properties such that in order to deflect the drill head 210 in the appropriate direction the pushing force (e.g., thrust) of the drill string alone may not be sufficient to deflect the drill head 210. Therefore, in certain types of soils, it would be desirable to deliver impacts to the drill bit 219A using the liquid driven hammer 216 while changing direction in the soil.

On the other hand, when drilling or boring in solid rock, the drill head 210 is generally not rotated and the deflection or steering of the drill head 210 is accomplished by delivering impacts to the drill bit 219A with the liquid driven hammer 216. The drill head 210 then changes direction in the solid rock using substantially the same shelving method as described above using the pneumatic hammer 16. For example, cutting a shape that is approximately circular, but leaving a sliver or shelf of rock remaining on the bottom and repeating the process many times. The shelving method described above produces a stair step with tapered risers and straight steps of the kind shown in FIG. 16. As described above, the action of the shelf changes the elevation of the drill head and helps it to change angular inclination.

There also may exist intermediate types of soils having properties such that the drill head 210 may be rotated over an arc less than 360 degrees (and/or remain stationary) while at the same time impacts are delivered to the drill bit 219A with the liquid driven hammer 216 in order to change direction in soil. Again, this procedure may be accomplished using substantially the same shelving method as described above using the pneumatic hammer 16. Under certain conditions, however, while the drill string may be rotated during the deflection or steering process, the impacts from the liquid driven hammer 216 may not be required.

Referring to FIG. 25B, a sectional view of the drill bit assembly 218 is illustrated. In one embodiment of the invention, the drill bit assembly 218 is disposed in a sleeve 217 having an inner surface 221 adapted for receiving the drill bit assembly 218 and an outer surface 223 adapted to be received by the distal end of the liquid driven hammer 216. It will be appreciated that the inner surface of the sleeve 217 may be provided with various features for receiving a drill stem 221A such as splines similar to splines 72B of drill stem 21A, as discussed above. Moreover, the outer surface 223 of the sleeve 217 may be provided with threads for coupling the drill bit assembly 218 to the distal end of the liquid driven hammer 216 having a matching set of threads provided therein.

It will be appreciated that a variety of drill bit assemblies may be used and interchanged with the drill bit assembly 218 without departing from the spirit and scope of the present invention. For example, the drill bit assembly 218 may be replaced by drill bits of the type disclosed by WO 99/19596 to Esposito and/or U.S. Pat. No. 5,778,991 and others. Those skilled in the art will appreciate that the selection of a drill bit is a matter of design choice which would be readily recognizable by the skilled artisan.

Referring back to FIG. 25, it will be appreciated that in one embodiment of the invention, the effective steering geometry of the drill bit 219A (e.g., a gage tower provided in the drill bit assemblies 18 and 218, or other drill bits which are "unbalanced"—for example drill bits having an asymmetric shape and/or arranged and configured so as to cut in an asymmetric manner) should be aligned such that the effective steering geometry is located at an outermost point away from the longitudinal axis "L" of the drill string. Furthermore, the effective steering geometry of the drill bit 219A should be aligned along the axis "l" of the liquid driven hammer 216. Accordingly, prior to use, the orientation of the sonde 246 (see FIG. 22A) should correspond with the orientation of the liquid driven hammer 216 and the effective steering geometry of the drill bit 219A.

Figure 26A:
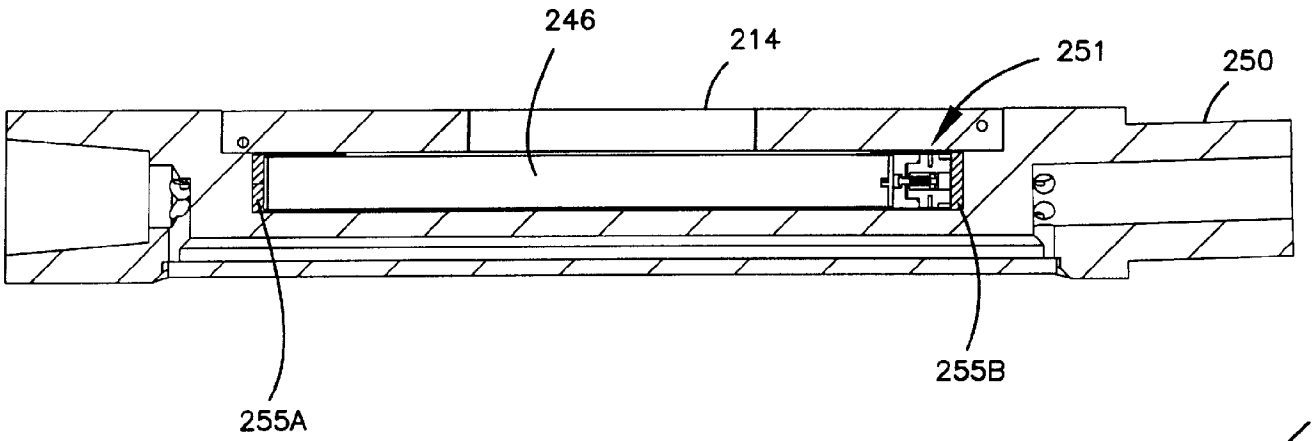
FIG. 26A is a sectional view of a holder for a device for detecting angular orientation according to the present invention.

Referring now to FIG. 26A, the sonde 246 is positioned within the sonde holder 214 between sonde shock absorbers 255A-B. A sonde indexer assembly 251 is interposed between the sonde 246 and the shock absorber 255B.

The outermost portion from the longitudinal axis "L" of the effective steering geometry of the drill bit 219A and the outermost point from the longitudinal axis "l" of the liquid driven hammer 216, must correspond with the orientation of the sonde 246. Therefore, the outermost portion, from the longitudinal axis "L", of the effective steering geometry of the drill bit 219A and the outermost portion, from the longitudinal axis "l," of the liquid driven hammer 216 are adjusted such that they are in alignment. The sonde indexer assembly 251 is provided to make the final orientation adjustments between the liquid driven hammer 216 and the drill bit 219A, and the sonde 246.

Figure 26B:
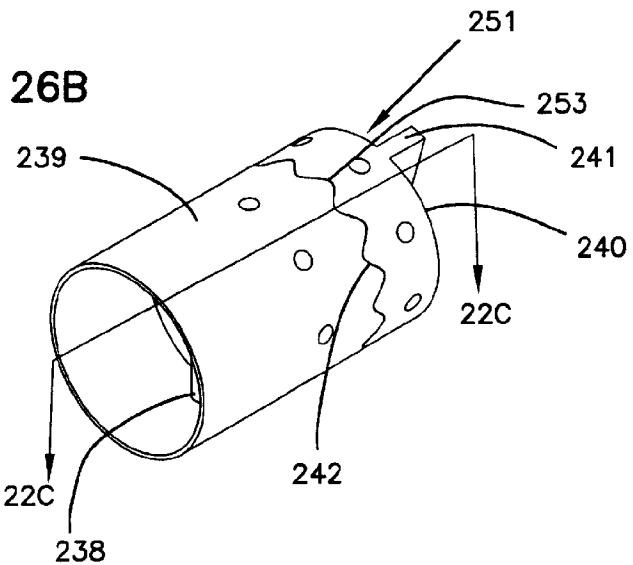
FIG. 26B shows a perspective view of an indexer assembly portion of a holder for detecting angular orientation according to the present invention.
Figure 26C:
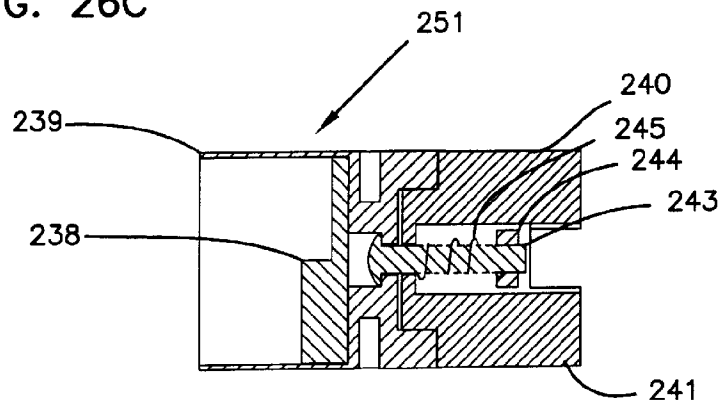
FIG. 26C shows a sectional view of an indexer assembly portion of a holder for detecting angular orientation including an isolator according to the present invention.

Referring now to FIGS. 26B-C, the sonde indexer assembly 251 includes a female sonde cap 239 having an indexing surface 242 and an indexing tab which includes a projection 241. An indexing cap 240 is provided which is coupled to the female sonde cap 239. The indexing cap 240 includes an indexing surface 253 which mates with the indexing surface 242 of the female sonde cap 239. The indexing tab projection 241 is adapted to couple with a corresponding slot formed in the shock absorber 255B.

The female sonde cap 239 of the sonde indexer assembly 251 includes a small projection 238. The female indexing cap 239 is coupled to the indexing cap 240 by way of retention bolt 243. The retention bolt 243 includes a retention nut 244 and a retention spring 245. The female sonde cap 239 is biased to the indexing cap 240 by the force of the retention spring 245. The retention force is adjustable by adjusting the retention nut 244.

In use, once the orientation between the effective steering geometry of the drill bit 210A and the liquid driven hammer 216 is fixed, the final adjustment is completed by indexing (e.g., rotating) the sonde indexer assembly 251 and the sonde 246, simultaneously, so as to bring all three elements (e.g., the sonde 246, the liquid driven hammer 216 and the effective steering geometry of the drill bit 219A) into their proper alignment. Once the three elements are adjusted, the orientation of the sonde 246 may be used to determine the deflection direction of the drill string whether the operator of the directional boring machine uses the bent axis of the liquid hammer 216 for deflecting the path of drilling or boring in compressible soils or whether the operator uses the drill bit 219A for deflecting the path of drilling or boring through solid rock. Of course, those skilled in the art will appreciate that indexing of the three elements may be accomplished using other techniques and structures without departing from the scope of the present invention.

Figure 27:
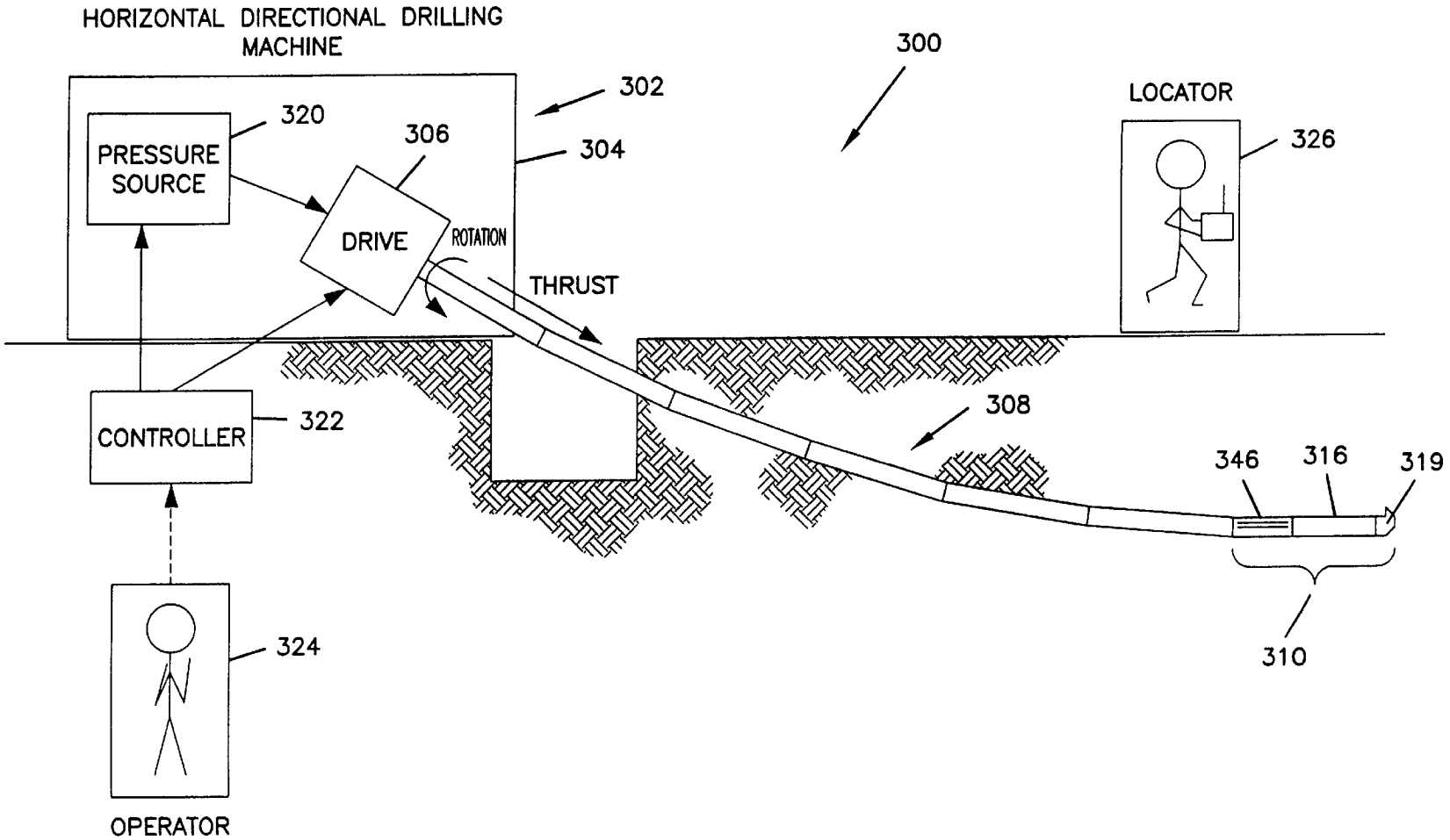
FIG. 27 illustrates a system including a directional boring machine according to the present invention.

Turning now to FIG. 27, a system 300 for drilling or boring a hole including a directional boring machine 302 is illustrated. The directional boring machine 302 includes a frame 304 with a drive member 306 for advancing and threading pipe together. The directional drilling machine 302 is used to push a drill string 308 of pipes into the. ground to bore a hole. Accordingly, in order to push a drill string 308 into the ground the directional boring machine 302 through the drive member 306 develops a thrust along the drill string axis.

The directional drilling machine 302 is also furnished with a pressure source 320 used for generating working pressures to be transmitted by the liquid for operating liquid driven hammers of the types described above (e.g., a standard type NIN liquid driven hammer and/or an aggressive flushing type GIN liquid driven hammer).

The system 300 for drilling or boring a hole may also include a controller 322 for monitoring and controlling the thrust developed by the drive member 306. The controller 322 may also be adapted for monitoring and controlling the pressure source 320.

It will be appreciated that the controller 322 may be a computerized control box including one or more microprocessors and various other control circuits. Examples of electronic control modules for performing these functions is described in U.S. patent application Ser. No. 09/405,889, "REAL-TIME CONTROL SYSTEM AND METHOD FOR CONTROLLING AN UNDERGROUND BORING MACHINE," filed Sep. 24, 1999 and U.S. Pat. No. 5,944,121 to Bischel which are both herein incorporated by reference in their entirety. Of course, those skilled in the art will appreciate that an operator 324 of the directional boring machine 302 may also be able to control the thrust and the pressure manually by way of operating control valves and observing parameter indicators which provide readings of pressure and thrust.

The drilling or boring system also includes a drill head 310 at a distal end of the drill string 308. The drill head 310 includes a sonde holder 314 including a sonde 346, a percussion or impact hammer 316 and a drill bit 319. A starter rod may also be included in the drill head 310. A locator 326 above ground locates the position of the sonde 346.

In use, the pressurized liquid is delivered in passages provided through the drill string 308 in order to operate the liquid driven hammer 316. As described above, the liquid driven hammer 316 delivers impacts to the drill head 319 in order to drill or bore into various types of soils. However, at times the percussive operation of the liquid driven hammer 316 may or may not be desirable. Accordingly, the present invention also provides a method for controlling the ON/FF states of the percussion hammer 316.

Figure 28:
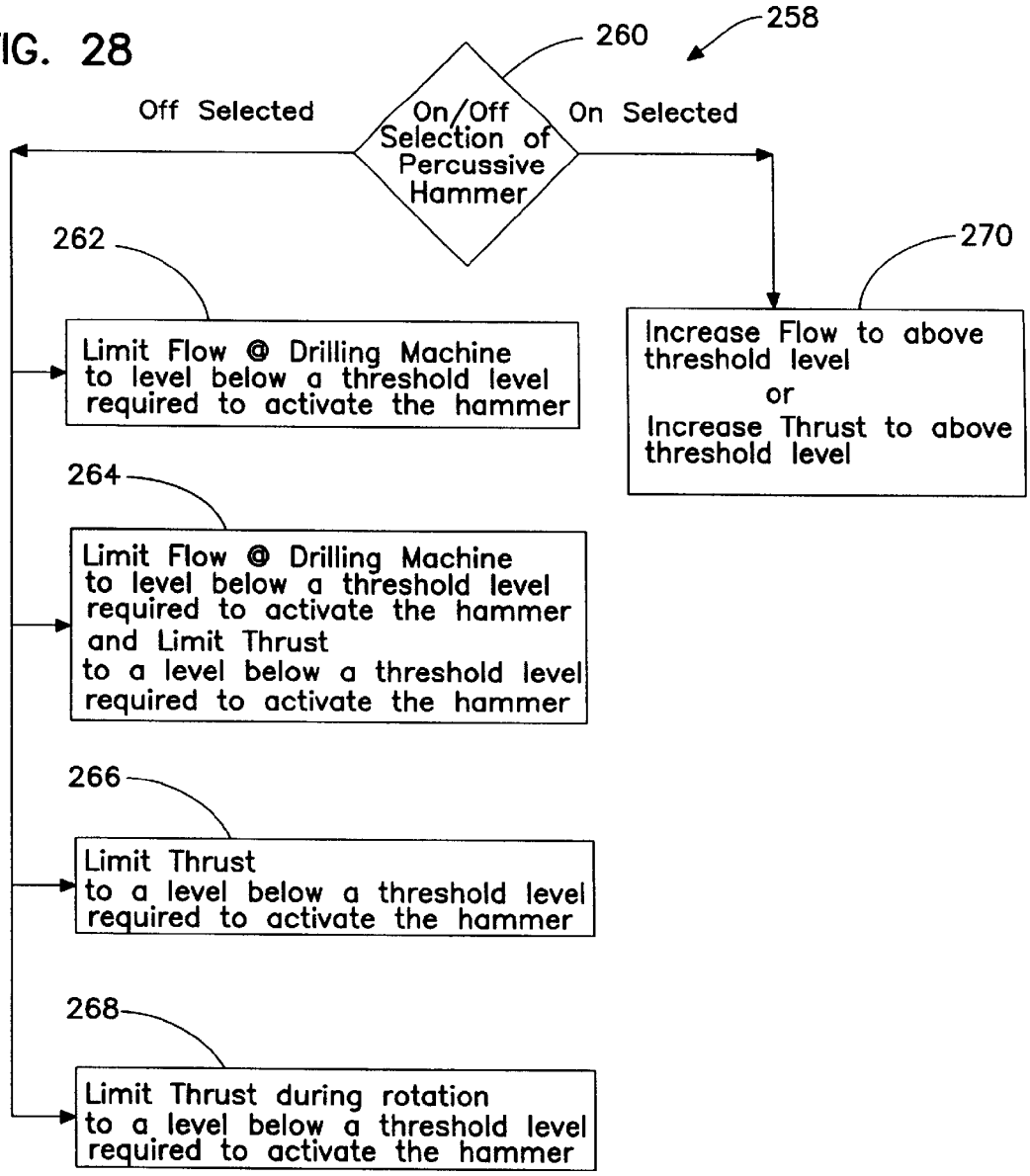
FIG. 28 is a flow chart illustrating a method of operation of the present invention.
Figure 29:
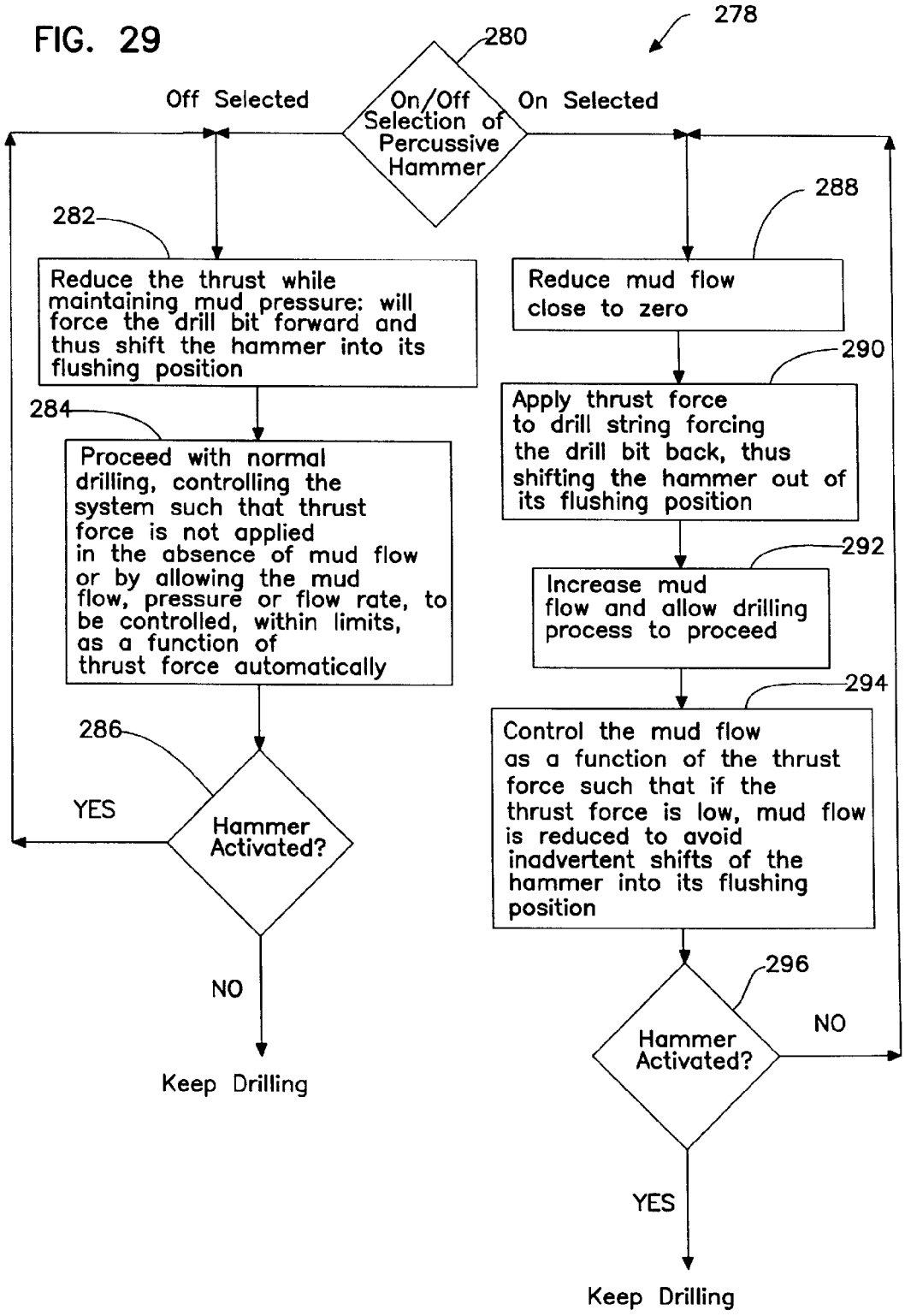
FIG. 29 is a flow chart illustrating a method of operation of the present invention.

Referring now to FIGS. 28 and 29, methods for ON/OFF control of the percussion hammers (e.g., pneumatic or liquid driven hammers) is illustrated. FIG. 28 illustrates one embodiment for ON/OFF control of a standard type NIN liquid driven hammer and FIG. 29 illustrates one embodiment for ON/OFF control of an aggressive flushing type GIN liquid driven hammer. It will be appreciated that these basic principles would be applicable to pneumatic hammers, similar to the pneumatic hammer 16 described above, provided that the threshold pressures are appropriately adjusted for operating the pneumatic hammer with a compressible fluid.

Those skilled in the art will appreciate that the following methods may be executed by the operator of the directional boring machine or by an electronic control module (controller hereinafter) of the directional boring machine. An example of an electronic control module for performing these functions is described in U.S. patent application Ser. No. 09/405,889, "REAL-TIME CONTROL SYSTEM AND METHOD FOR CONTROLLING AN UNDERGROUND BORING MACHINE," filed Sep. 24, 1999, which is herein incorporated by reference in its entirety.

FIG. 28 illustrates a flow chart 258 of one embodiment of a method for ON/OFF control of a standard type NIN liquid driven hammer. Those skilled in the art will appreciate that these basic principles are applicable to a pneumatic hammer, similar to the pneumatic hammer 16 described above, provided that the threshold pressures are appropriately adjusted for operating a pneumatic hammer with a compressible fluid.

One example of the limits of operation of a standard type NIN liquid driven hammer is as follows:

With a force applied to the drill bit of at least 300-500 lbs, liquid flow required to activate the hammer will be 15 to 20 Gallons per Minute (gpm).

1) If it is desirable to NOT ACTIVATE the hammer, the liquid flow will be limited to:
   a) When the force acting on the drill bit is within about 0 to 500 lbs., the flow rate must be set to about 15 gpm;
   b) When the force acting on the drill bit is greater than about 500 lbs., the maximum flow rate should be set to a Maximum Flow Rate (gpm)=0.03×Force (lbs.);
2) If it is desirable to ACTIVATE the hammer, the liquid flow rate should be set to a minimum flow rate of:
   a) Minimum Flow Rate (gpm) =0.03×Force (lbs.).

Accordingly, at block 260, the operator or the controller selects whether to use the percussive function of the hammer. If the percussive function is not selected, at block 262 the operator or controller limit the flow of liquid at the directional boring machine to a level below a threshold required to activate the standard type NIN liquid driven hammer.

Then, at block 264, while maintaining the liquid flow below the threshold required to activate the standard type NIN liquid driven hammer, the thrust of the directional boring machine is adjusted to a level below a threshold level required to activate the standard type NIN liquid driven hammer. Since there is a relationship between thrust force and flow rate, if the flow rate exceeds a predetermined amount, then the thrust force may be kept below a certain level to ensure that the hammer will not activate. One example of a sequence includes setting a flow rate to a desired level, and then applying a thrust force. Alternatively, a thrust force may be applied first to a desired level, and then setting the flow rate. For example, the flow rate may initially set at 15 gpm with no thrust force applied. Then once the thrust force reaches 500 lbs., for example, the flow rate (gpm) may be increased at a ratio of 0.03×Force (lbs.).

At block 266, the thrust is maintained at a level below which the liquid hammer will not activate. Furthermore, if rotation of the drill string is required during the drilling or boring process, the thrust is limited to a level below the threshold required for the standard type NIN liquid driven hammer to activate.

If, at block 260, the operator or controller selects to use the percussive function of the hammer, the process switches to block 270. At block 270, the liquid flow is increased to a level above the threshold required for the liquid hammer to activate. Alternatively, the thrust provided by the directional boring machine is increased to a level above the threshold level required for the liquid hammer to activate.

FIG. 29 illustrates a flow chart 278 of one embodiment of a method for ON/OFF control of an aggressive flushing type GIN liquid driven hammer. Those skilled in the art will appreciate that these basic principles are applicable to a pneumatic hammer, similar to the pneumatic hammer 16 described above, provided that the threshold pressures are appropriately adjusted for operating a pneumatic hammer with a compressible fluid.

As discussed above, one example of the limits of operation of an aggressive flushing type GIN liquid driven hammer is as follows:

1) If it is desirable to NOT ACTIVATE the hammer, the following sequence is performed:
   a) Reduce the force to approximately zero;
   b) Apply liquid flow at a rate of 15 gpm to the liquid hammer, resulting in the hammer shifting into the flushing position;
   c) From then on control the liquid flow rate and thrust force acting on the drill bit such that:
      The Minimum Flow Rate (gpm)=0.025×force (lbs.); or
      The Maximum Force (lbs.)=40×flow rate (gpm).
2) If it is desirable to ACTIVATE the hammer, the following sequence is performed:
   a) Reduce the liquid flow rate to the hammer to approximately zero;
   b) Apply force of minimum 500 lbs.
   c) Apply liquid flow of minimum of 15 gpm;
   d) From then on control such that:
      The Minimum Force (lbs.)=40×flow rate (gpm); or
      The Maximum Flow Rate (gpm)=0.025×force (lbs.).

At block 280, the operator or the controller selects whether to use the percussive function of the hammer. If the percussive function is selected, at block 282 the operator or controller reduces the thrust developed by the directional boring machine while simultaneously maintaining the pressure of the drilling liquid in the drill string. The combination of reducing the thrust and maintaining the drilling liquid pressure forces that drill bit to travel in a forward direction towards the drilling or boring direction and thereby shifts the aggressive flushing type GIN liquid driven hammer into its flushing position. In the flushing position, the driven hammer 316 does not reciprocate and the drilling liquid merely exits through ports 222A.

At block 284, the drilling or boring process now proceeds in a conventional way without the aid of the percussive action of the aggressive flushing type GIN liquid driven hammer. It will be appreciated that the thrust force may not be applied in the absence of drilling liquid (e.g., mud flow) within the drill string since the application of a thrust force without the presence of drilling liquid pressure would cause the drill bit 219A to shift backwards in the direction of the directional drilling machine. Furthermore, the drilling liquid flow, pressure or flow rate should be controlled within certain predetermined limits which will vary as a function of thrust force. It will be appreciated that the limits may be automatically controlled by the controller.

At block 286 the liquid driven hammer is monitored in order to determine if has been inadvertently activated. If not, percussionless drilling continues. Otherwise, the process continues at block 282 until the operation of the driven hammer 316 ceases.

If the operator or the controller selected the percussive function of the hammer at block 280, the process shifts to block 288 where the drilling liquid flow is then substantially reduced to about zero. As indicated in block 290, a thrust force is then applied to the drill string by the directional boring machine such that the drill bit 219A is forced to move backwards, towards the directional boring machine, and thereby shifting the aggressive flushing type GIN liquid driven hammer out of its flushing position.

At block 292, the operator or controller then increases the flow of drilling liquid until the aggressive flushing type GIN liquid driven hammer begins the percussion process and the drilling or boring process continues. The operator or the controller then controls the drilling liquid flow as a function of the thrust force such that if the drilling thrust force is low, the drilling liquid flow is reduced to avoid inadvertently shifting the aggressive flushing type GIN liquid driven hammer into it flushing position.

At block 296 the aggressive flushing type GIN liquid driven hammer is monitored in order to determine if it has been inadvertently deactivated. If not, percussion drilling continues. Otherwise, the process continues at block 288 until the percussion operation of the aggressive flushing type GIN liquid driven hammer begins.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims.

What is claimed is:

1. An apparatus, for use in horizontal directional drilling in compressible soil, non-compressible soil, or rock, of the type having a drill string coupled to a directional boring machine at a proximal end and a drill head coupled to the drill string at a distal end of the drill string, comprising:

a drill bit generally adapted and configured to bore through rock;

a device for determining the angular orientation of the drill bit and for providing a generated signal corresponding to the orientation; and an offset coupling member attached at a first end to the drill string and at a second end to the drill bit, the offset coupling member angularly offsetting the drill head from a longitudinal axis of the drill string, wherein, the offset coupling member is oriented in response to the generated signals to steer the drill bit*;*

*wherein the drill bit further comprises an effective steering geometry suitable for steering the drill bit.*

2. An apparatus according to claim 1, further comprising a hammer driven by a liquid interposed between the offset coupling member and the drill bit.

[3. An apparatus according to claim 1, wherein the drill bit further comprises an effective steering geometry suitable for steering the drill bit.]

4. An apparatus according to claim [3] *1*, wherein the effective steering geometry is a gage tower radially outwardly offset from an outermost point away from the longitudinal axis of the drill string and having one or more frontwardly facing gage cutting teeth disposed thereon, the one or more gage cutting teeth being suitable for cutting over an angle defined by less than one full rotation of the drill bit.

5. A system for use in horizontal directional drilling in compressible soil and rock, comprising:

a horizontal directional drilling machine having a drill string coupled thereto, the directional drilling machine being used to rotate and push the drill string into a medium to be bored, the directional drilling machine including a drive member adapted to be coupled to a proximate end of the drill string and generally configured for applying a thrust force to the drill string;

a pressure source for generating a working pressure to be transmitted through a liquid used for drilling; and a controller for controlling the thrust force generated by the drive member and for controlling the working pressure output of the pressure source;

wherein the drill string includes at a distal end:

a device for detecting angular orientation *and for providing a generated signal corresponding to the orientation*;

a holder for the device for detecting angular orientation *and for providing a generated signal corresponding to the orientation*, the device for detecting angular orientation *and for providing a generated signal corresponding to the orientation* being disposed therein;

a hammer driven by the liquid; and a drill bit including a frontwardly facing main cutting surface, the frontwardly facing main cutting surface having an effective steering geometry for steering the drill string;

wherein, the holder, the hammer and the drill bit are connected head to tail along a longitudinal axis of the drill string with the holder being located at a proximate end of the drill string and the drill bit being located at a distal end of the drill string*;*

*wherein the system further includes an offset coupling member attached at a first end to the drill string and at a second end to the drill bit, the offset coupling member angularly offsetting the drill bit from a longitudinal axis of the drill string to establish the angular orientation of the drill bit, wherein, the offset coupling member is oriented in response to the generated signals to steer the drill bit.*

6. A system according to claim 5, wherein the effective steering geometry is a gage tower radially outwardly offset from an outermost point away from the longitudinal axis of the drill string and having one or more frontwardly facing gage cutting teeth disposed thereon, the one or more gage cutting teeth being suitable for cutting over an angle defined by less than one full rotation of the drill bit.

7. A system according to claim 5, wherein the frontwardly facing main cutting surface includes one or more cutting teeth disposed thereon.

8. A system according to claim 5, wherein the controller is an electronic automatic controller.

9. A system according to claim 5, wherein the controller is operated by an operator.

10. An apparatus, for use in horizontal directional drilling in compressible soil, non-compressible soil, or rock, of the type having a drill string coupled to a directional boring machine at a proximal end and a drill head coupled to the drill string at a distal end along a longitudinal axis of the drill string, comprising:

a drill bit with a longitudinal axis generally adapted and configured to bore through rock, the drill bit including:

a frontwardly facing circular main cutting surface having a plurality of main cutting teeth disposed thereon in a single plane substantially perpendicular to the longitudinal axis; and a gage tower extending radially outwardly from the main cutting surface, which gage tower having a plurality of gage teeth positioned in an arc comprising less than one-half of the circumference of the bit;

an offset coupling member attached at a first end to the drill string and at a second end to the drill bit, the offset coupling member causing the longitudinal axis of the drill bit to be angularly offset at an angle from the longitudinal axis of the drill string, and the direction of the offset being coordinated with the location of the gage tower of the drill bit; and a device for determining the angular orientation of the offset coupling member or the gage tower of the drill bit, and for providing a generated signal corresponding to the orientation, wherein, the offset member is oriented in response to the generated signals to steer the drill bit.

11. An apparatus according to claim 10, further comprising a hammer driven by a liquid interposed between the offset coupling member and the drill bit.

*12. An apparatus according to claim 1, wherein during use the drill bit is not rotatable relative to the offset coupling member.*

*13. An apparatus according to claim 1, wherein the drill bit is non-rotatably mounted relative to the offset coupling member.*

*14. An apparatus according to claim 1, wherein the drill head is angularly offset from the longitudinal axis of the drill string between 0.5 to 2.0 degrees.*

*15. An apparatus according to claim 1, wherein the drill head further comprises shock absorbers at opposite ends of the device for determining the angular orientation of the drill bit.*

*16. An apparatus according to claim 1, wherein the device for determining the angular orientation of the drill bit is loaded into a compartment through a door arranged on a side of the drill head.*

*17. An apparatus according to claim 1, wherein the drill head includes a hammer for generating impacts transferred to the drill bit.*

*18. An apparatus according to claim 17, wherein the hammer is pneumatic.*

*19. An apparatus, for use in horizontal directional drilling in compressible soil, non-compressible soil, or rock, of the type having a drill string coupled to a directional boring machine at a proximal end and a drill head coupled to the drill string at a distal end of the drill string, comprising:*

*a drill bit generally adapted and configured to bore through rock;*

*a device for determining the angular orientation of the drill bit and for providing a generated signal corresponding to the orientation; and*

*an offset coupling member attached at a first end to the drill string and at a second end to the drill bit, the offset coupling member angularly offsetting the drill head from a longitudinal axis of the drill string, wherein, the offset coupling member is oriented in response to the generated signals to steer the drill bit; and*

*the drill bit being non-rotatably mounted relative to offset coupling member.*

*20. An apparatus according to claim 19, wherein the drill head is angularly offset from the longitudinal axis of the drill string between 0.5 to 2.0 degrees.*

*21. An apparatus according to claim 19, wherein the drill head further comprises shock absorbers at opposite ends of the device for determining the angular orientation of the drill bit.*

*22. An apparatus according to claim 19, wherein the device for determining the angular orientation of the drill bit is loaded into a compartment through a door arranged on a side of the drill head.*

*23. An apparatus according to claim 19, wherein the drill head includes a hammer for generating impacts transferred to the drill bit.*

*24. An apparatus according to claim 19, wherein the hammer is pneumatic.*

*25. An apparatus according to claim 19, wherein the drill bit is asymmetric.*

*26. An apparatus, for use in horizontal directional drilling in compressible soil, non-compressible soil, or rock, of the type having a drill string coupled to a directional boring machine at a proximal end and a drill head coupled to the drill string at a distal end of the drill string, the drill head comprising:*

*a drill bit generally adapted and configured to bore through rock;*

*a sensing device mounted in a compartment of the drill head for determining the angular orientation of the drill bit and for providing a generated signal corresponding to the orientation wherein at least one shock absorber isolates the sensing device from vibrations and shocks;*

*an offset coupling member attached at a first end to the drill string and at a second end to the drill bit, the offset coupling member angularly offsetting the drill head from a longitudinal axis of the drill string to establish the angular orientation of the drill bit, wherein, the offset coupling member is oriented in response to the generated signals to steer the drill bit;*

*a hammer for delivering impacts to the drill bit, the offset coupling member including a hammer housing that houses the hammer and a sensing device housing that houses the sensing device, the hammer housing and the sensing device housing being angled relative to one another, the hammer housing being positioned between the sensing device housing and the drill bit and the sensing device housing aligning with the longitudinal axis of the drill string; and*

*the offset coupling member defining a passage for carrying compressed fluid through the drill head to the hammer for actuating the hammer, the passage being isolated from the compartment, wherein a bend of the offset coupling member is located at an interface between the sensing device housing and the hammer housing.*

*27. The apparatus of claim 26, wherein the sensing device housing is directly adjacent to the hammer housing.*

*28. The apparatus of claim 26, wherein the sensing device housing is directly coupled to the hammer housing.*

*29. The apparatus of claim 26, wherein ends of the sensing device housing and the hammer housing are connected by a threaded connection.*

*30. An apparatus according to claim 26, wherein the device for determining the angular orientation of the drill bit is loaded into the compartment through a door arranged on a side of the drill head.*

*31. An apparatus according to claim 26, wherein the drill bit is non-rotatably mounted relative to the offset coupling member.*

*32. An apparatus, for use in horizontal directional drilling in compressible soil, non-compressible soil, or rock, of the type having a drill string coupled to a directional boring machine at a proximal end and a drill head coupled to the drill string at a distal end of the drill string, comprising:*

*a horizontal directional drilling machine for applying thrust and torque to the drill string; and*

*a drill head including:*

*a drill bit generally adapted and configured to bore through rock;*

*a device mounted in a compartment of the drill head for determining the angular orientation of the drill bit and for providing a generated signal corresponding to the orientation wherein at least one shock absorber isolates the device from vibrations and shocks;*

*an offset coupling member attached at a first end to the drill string and at a second end to the drill bit, the offset coupling member angularly offsetting the drill head from a longitudinal axis of the drill string to establish the angular orientation of the drill bit, wherein, the offset coupling member is oriented in response to the generated signals to steer the drill bit; and*

*a hammer for delivering impacts to the drill bit.*

*33. An apparatus according to claim 32, wherein a bend of the offset coupling member is located at an interface between a sensing device housing and a hammer housing.*

*34. The apparatus of claim 33, wherein the sensing device housing is directly coupled to the hammer housing.*

*35. The apparatus of claim 34, wherein ends of the sensing device housing and the hammer housing are connected by a threaded connection.*

*36. An apparatus according to claim 32, wherein the device for determining the angular orientation of the drill bit is loaded into the drill head through a door arranged on a side of the drill head.*

*37. The apparatus of claim 32, wherein the device generates a locate signal that is transmitted through the ground and received by an above-ground locator.*

*38. The apparatus of claim 37, wherein the locator is a hand-held locator.*

* * * * *